(12) United States Patent
Asai et al.

(10) Patent No.: US 7,325,736 B2
(45) Date of Patent: Feb. 5, 2008

(54) OPTICAL SCANNER AND IMAGE FORMING APPARATUS HAVING THE SAME

(75) Inventors: Nobuaki Asai, Hashima-gun (JP); Mitsuyoshi Watanabe, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/441,236

(22) Filed: May 26, 2006

(65) Prior Publication Data

US 2006/0226226 A1 Oct. 12, 2006

Related U.S. Application Data

(63) Continuation of application No. PCT/JP2004/017379, filed on Nov. 24, 2004.

(30) Foreign Application Priority Data

Nov. 27, 2003 (JP) ............................. 2003-397385
Dec. 18, 2003 (JP) ............................. 2003-420487

(51) Int. Cl.
*G06K 7/10* (2006.01)
(52) U.S. Cl. ...................... 235/454; 359/201; 359/208; 359/212
(58) Field of Classification Search ................ 235/454; 359/208, 201, 212
See application file for complete search history.

(56) References Cited

U.S. PATENT DOCUMENTS 5,742,419 A 4/1998 Dickensheets et al.

| 7,075,687 B2 * | 7/2006 | Lippert et al. ............... 359/201 |
| 7,129,472 B1 * | 10/2006 | Okawa et al. ............... 359/201 |
| 2002/0101643 A1 | 8/2002 | Kobayashi |

FOREIGN PATENT DOCUMENTS

| JP | A 1-257916 | 10/1989 |
| JP | A 6-139387 | 5/1994 |
| JP | A 9-54261 | 2/1997 |
| JP | A 9-230248 | 9/1997 |
| JP | A 2000-111829 | 4/2000 |

(Continued)

*Primary Examiner*—Michael G. Lee
*Assistant Examiner*—Allyson N Trail
(74) *Attorney, Agent, or Firm*—Oliff & Berridge, PLC

(57) ABSTRACT

An optical scanner is disclosed which includes: a first scanning device having a first mirror portion in which a first reflective surface is formed, the first scanning device scanning in a first direction, light which impinges obliquely on the first reflective surface, by oscillatory rotation of the first mirror portion about a first oscillation axi; and a second scanning device having a second mirror portion in which a second reflective surface is formed so as to be generally in parallel to the first reflective surface in a non-active state of the optical scanner, the second scanning device scanning in a second direction intersecting with respect to the first direction, the light exiting the first reflective surface and then entering obliquely the second reflective surface, by oscillatory rotation of the second mirror portion about a second oscillation axis intersecting with respect to the first oscillation axis. The first oscillation axis is oriented substantially parallel to a direction in which the light enters the first reflective surface, when the optical scanner is viewed in a direction perpendicular to the first and second reflective surfaces.

21 Claims, 23 Drawing Sheets

FOREIGN PATENT DOCUMENTS

| | | |
|---|---|---|
| JP | A 2001-125037 | 5/2001 |
| JP | A 2002-196277 | 7/2002 |
| JP | EP 1 225 470 A2 | 7/2002 |
| JP | A 2004-532425 | 10/2004 |
| WO | WO 02/077697 A2 | 10/2002 |

* cited by examiner

OPTICAL SCANNER AND IMAGE FORMING APPARATUS HAVING THE SAME

CROSS-REFERENCE TO RELATED APPLICATIONS

This application is based on Japanese Patent Applications No. 2003-420487 filed Dec. 18, 2003 and No. 2003-397385 filed Nov. 27, 2003, and International Application No. PCT/JP2004/017379 filed Nov. 24, 2004, the contents of which are incorporated hereinto by reference.

This is a continuation of International Application No. PCT/JP2004/017379 filed Nov. 24, 2004, which was published in Japanese under PCT Article 21 (2).

BACKGROUND OF THE INVENTION

1. Field of the Invention

The invention relates to an optical scanner for scanning incident light two-dimensionally by oscillatory rotation of a reflective surface on which light is incident, and an image forming apparatus having such an optical scanner, and more particularly to improvements in construction of the optical scanner.

2. Description of the Related Art

There is already known an optical scanner for scanning light, which is of a type in which incident light is scanned two-dimensionally by oscillatory rotation of a reflective surface on which light is incident (See, for example, FIGS. 7 and 8 of Japanese Patent Application Publication No. 2000-111829).

Such an optical scanner is for use in the fields of, for example, image formation and image reading. In the field of image formation, such an optical scanner is applied to retinal scanning display devices which scan a beam of light on the retina of a viewer for direct presentation of an image onto the retina; projectors; laser printers; devices for use in laser lithography; or other applications. In the field of image reading, such an optical scanner is applied to facsimile machines; copiers; image scanners; bar-code readers; or other applications.

For such an optical scanner, in some cases, there are strong needs of a reduction in size and weight, which are satisfied by an exemplary conventional optical scanner disclosed in the aforementioned Japanese Patent Application Publication No. 2000-111829.

More specifically, in the above exemplary conventional optical scanner, horizontal and vertical scanning devices are disposed in series in a direction in which light travels, in the order set forth above. These horizontal and vertical scanning devices are configured to cause respective mirror portions having respective reflective surfaces formed thereon, to angularly oscillate about corresponding respective oscillation axes, to thereby scan light which has obliquely entered the respective reflective surfaces. The mirror portions of the horizontal and vertical scanning devices are formed on the same substrate, resulting in coplanar disposition of the reflective surfaces of these mirror portions.

BRIEF SUMMARY OF THE INVENTION

In the exemplary conventional optical scanner described above, light enters obliquely the reflective surface of the mirror portion of the horizontal scanning device. For this reason, the entry of light results in the formation of an ellipse-shaped spot on the reflective surface. The major axis of the spot is parallel to the light entry direction, while the minor axis of the same spot is perpendicular to the light entry direction.

In the aforementioned exemplary conventional optical scanner, the oscillation axis of the mirror portion of the horizontal scanning device is perpendicular to the light entry direction. For this reason, there is formed on the mirror portion, the spot to be elongated in a direction (hereinafter, also referred to as "rotation radial direction") perpendicular to the oscillation axis.

In general, a mirror portion is designed in shape to allow the mirror portion to receive light coming in the mirror portion, without overflow of light. In addition, as a dimension of a mirror portion in the rotation radial direction becomes larger, the moment of inertia of the mirror portion becomes larger, resulting in increasing difficulty in increasing a scan frequency of the mirror portion.

Additionally, in general, there are performed on a scanned plane on which light is scanned, a horizontal scan for horizontally scanning light, and a vertical scan for scanning light in a direction intersecting with respect to a horizontal scan line. On the scanned plane, during per succession of scans, the horizontal scan is repeated frequently, while the vertical scan is repeated less frequently than the horizontal scan. For these reasons, in general, the horizontal scan more strongly requires fast oscillatory rotation of the mirror portion, which is to say, to scan light at a high frequency, than the vertical scan.

Despite of the presence of such needs, in the aforementioned exemplary conventional optical scanner, the oscillation axis of the mirror portion of the horizontal scanning device is disposed perpendicular with respect to the light entry direction, resulting in the presence of an unexpected tendency of the mirror portion to increase in size in its rotation radial direction for allowing the mirror portion to receive light coming in the mirror portion, without overflow of light. For these reasons, this exemplary conventional optical scanner faces difficulties in scanning light at a high scan frequency in the horizontal scanning device having a stronger need to increase its scan frequency than that of the vertical horizontal scanning device.

In view of the circumstances described above, the present invention is made for an object to provide an optical scanner for scanning incident light two-dimensionally by oscillatory rotation of a reflective surface on which light is incident and an image forming apparatus having the optical scanner, with a configuration of the optical scanner which more easily achieves an increase in scan rate of light and downsizing of the optical scanner.

According to a first aspect of the present invention, an optical scanner is provided for scanning incident light two-dimensionally by oscillatory rotation of a reflective surface on which light is incident.

This optical scanner include:

a first scanning device having a first mirror portion in which a first reflective surface is formed, the first scanning device scanning in a first direction, light which impinges obliquely on the first reflective surface, by oscillatory rotation of the first mirror portion about a first oscillation axis; and a second scanning device having a second mirror portion in which a second reflective surface is formed so as to be generally in parallel to the first reflective surface in a non-active state of the optical scanner, the second scanning device scanning in a second direction intersecting with respect to the first direction, the light exiting the first reflective surface and then entering obliquely the second reflective surface, by oscillatory rotation of the second mirror portion about a second oscillation axis intersecting with respect to the first oscillation axis.

In this optical scanner, the first oscillation axis is oriented substantially parallel to a direction in which the light enters the first reflective surface, when the optical scanner is viewed in a direction perpendicular to the first and second reflective surfaces.

According to a second aspect of the present invention, an image forming apparatus is provided for forming apparatus for forming images by scanning a light beam.

This image forming apparatus includes:

a light source emitting the light beam; and an optical scanner two-dimensionally scanning the light beam once exiting the light source, to thereby form the images.

The optical scanner includes:

a first scanning device having a first mirror portion in which a first reflective surface is formed, the first scanning device scanning in a first direction, the light beam which impinges obliquely on the first reflective surface, by oscillatory rotation of the first mirror portion about a first oscillation axis; and a second scanning device having a second mirror portion in which a second reflective surface is formed so as to be generally in parallel to the first reflective surface in a non-active state of the optical scanner, the second scanning device scanning in a second direction intersecting with respect to the first direction, the light beam exiting the first reflective surface and then entering obliquely the second reflective surface, by oscillatory rotation of the second mirror portion about a second oscillation axis intersecting with respect to the first oscillation axis.

In this optical scanner, the first oscillation axis is oriented substantially parallel to a direction in which the light beam enters the first reflective surface, when the optical scanner is viewed in a direction perpendicular to the first and second reflective surfaces.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
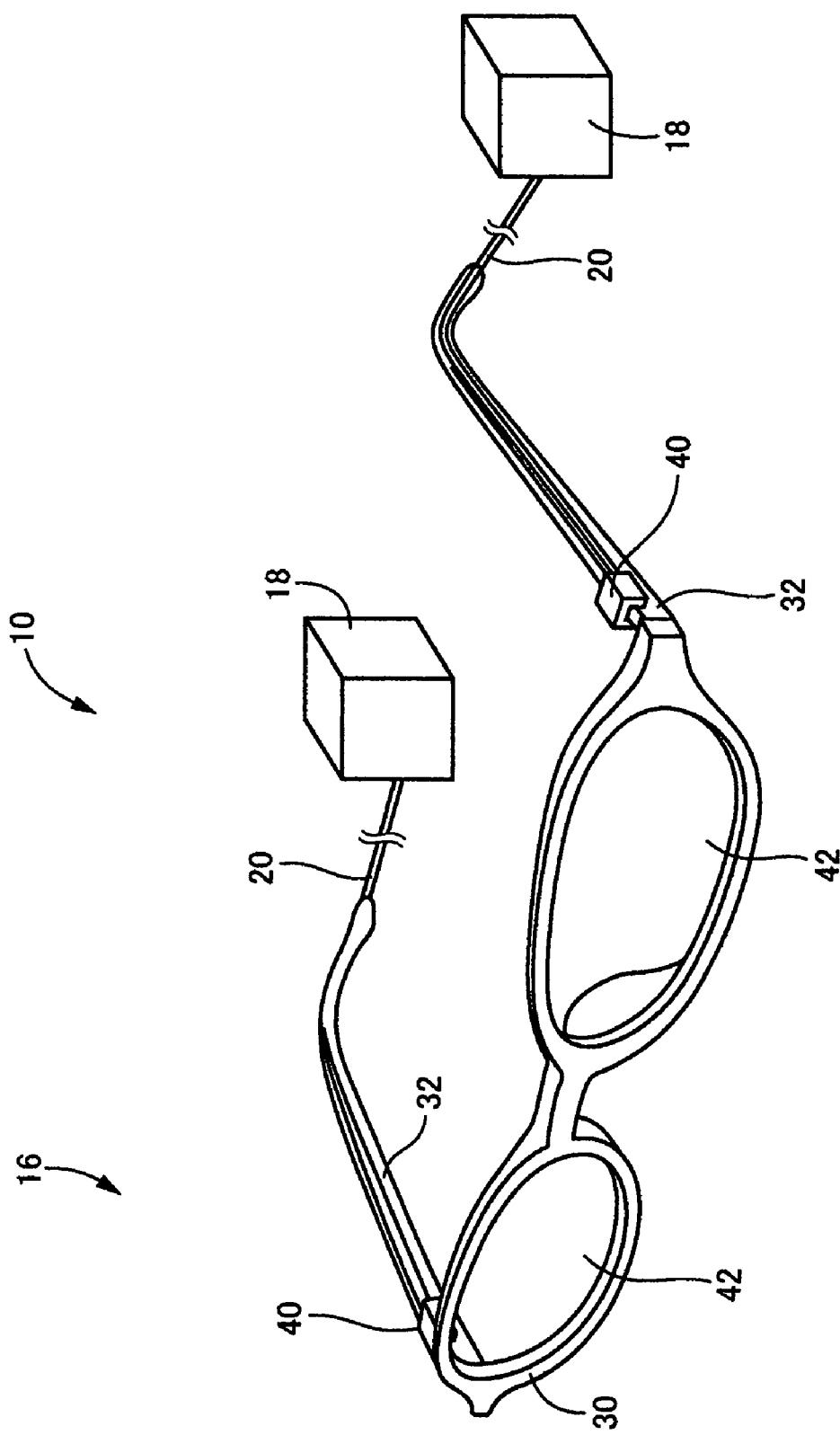
FIG. 1 is a perspective view illustrating a retinal scanning display device 10 constructed according to a first embodiment of the present invention.

The object mentioned above may be achieved according to any one of the following modes of this invention.

These modes will be stated below so as to be sectioned and numbered, and so as to depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the modes of the invention in such a dependent form as to depend from the other mode or modes does not exclude the possibility that the technological features set forth in a dependent-form mode become independent of those set forth in the corresponding depended mode or modes and to be removed therefrom. It should be interpreted that the technological features set forth in a dependent-form mode is allowed to become independent, where appropriate.

(1) An optical scanner for scanning incident light two-dimensionally by oscillatory rotation of a reflective surface on which light is incident, the optical scanner comprising:

a first scanning device having a first mirror portion in which a first reflective surface is formed, the first scanning device scanning in a first direction, light which impinges obliquely on the first reflective surface, by oscillatory rotation of the first mirror portion about a first oscillation axis; and a second scanning device having a second mirror portion in which a second reflective surface is formed so as to be generally in parallel to the first reflective surface in a non-active state of the optical scanner, the second scanning device scanning in a second direction intersecting with respect to the first direction, the light exiting the first reflective surface and then entering obliquely the second reflective surface, by oscillatory rotation of the second mirror portion about a second oscillation axis intersecting with respect to the first oscillation axis, wherein the first oscillation axis is oriented substantially parallel to a direction in which the light enters the first reflective surface, when the optical scanner is viewed in a direction perpendicular to the first and second reflective surfaces.

In this optical scanner, two scanning devices are disposed in series along a light travel direction, and two reflective surfaces of these two scanning devices are disposed generally parallel to each other in a non-active state of the instant optical scanner.

This optical scanner would therefore make it easier, for example, to miniature this optical scanner in a direction perpendicular to the two reflective surfaces, and to miniature this optical scanner in a direction in which these two reflective surfaces are arrayed.

Further, in this optical scanner, one of the two scanning devices which is located on an upstream one of both sides spaced apart in a light travel direction, i.e., the first scanning device, is adapted, such that, when the instant optical scanner is viewed perpendicularly to a reflective surface of the first scanning device, an oscillation axis of a mirror portion of the first scanning device is substantially parallel to a direction in which light enters the reflective surface.

This optical scanner would therefore prevent the elongation of a spot formed on the reflective surface due to oblique entry of light into the reflective surface, from causing a major axis of the spot to be oriented perpendicularly to the oscillation axis of the reflective surface. As a result, the selection in shape of the mirror portion in conformity with such a spot would not cause a dimension of the mirror portion in the rotation radial direction, to be longer than that of the aforementioned exemplary conventional optical scanner.

This optical scanner would therefore facilitate a reduction in moment of inertia of the mirror portion, and would eventually facilitate an increase in scan frequency of the mirror portion. Consequently, this optical scanner would facilitate co-achievement of both an increase in scan frequency and a reduction in size of the optical scanner.

Although this optical scanner is configured such that the first and second reflective surfaces are disposed generally parallel to each other in an non-active state of this optical scanner, a more specific layout of these two reflective surfaces may be, for example, one in which these two reflective surfaces are arrayed on a substantially single flat plane, one in which these two reflective surfaces are disposed on two opposite flat planes which are substantially parallel to each other and which leave a special clearance therebetween, respectively, with these two reflective surfaces not entirely confronting with each other, etc.

The "first oscillation axis" and "second oscillation axis" set forth in this mode may each be defined, for example, as an axis parallel to a corresponding one of the mirror portions, or as an axis passing through the corresponding mirror portion in parallel thereto.

(2) The optical scanner according to mode (1), wherein the first scanning device further includes a first actuator for angularly oscillating the first mirror portion using a piezoelectric element, and wherein the second scanning device further includes a second actuator for angularly oscillating the second mirror portion using a piezoelectric element.

In this optical scanner, each of two mirror portions is angularly oscillated by its actuator using a piezoelectric element. This optical scanner would therefore readily allow high-speed oscillation of the mirror portions with a reduced size of the optical scanner, compared with the aforementioned exemplary conventional optical scanner in which its mirror portion or portions are oscillated by electromagnetic or electrostatic force.

(3) The optical scanner according to mode (1) or (2), wherein the light incident on the first reflective surface is parallel light or parallel beam of light.

For the optical scanner according to the previous mode (1) or (2), when the light entering the first reflective surface (hereinafter, referred to simply as "incident light") is selected as non-parallel light, which is to say, diverging light or converging light, an area of cross section of light within the instant optical scanner tends to become larger than when the incident light is selected as parallel light. Due to this, when the incident light is selected as non-parallel light, an area of a mirror portion which is ideally receive light within this instant optical scanner, without overflow of light tends to increase, compared with when the incident light is selected as parallel light. The tendency invites an increase in size, weight, and moment of inertia, of the mirror portions.

In contrast, the optical scanner according to this mode, the incident light is selected as parallel light or a parallel beam of light. This optical scanner would therefore facilitate a reduction in size, weight, and moment of inertia, of the mirror portions, eventually facilitating an increase in scan rate of light.

(4) The optical scanner according to any one of modes (1) through (3), wherein the first scanning device scans the light at a frequency higher than that of the second scanning device.

This optical scanner would allow a scan frequency of the first scanning device to be higher than that of the second scanning device, by utilizing the technical features resulting from the aforementioned specific layout of the optical scanner according to the previous mode (1).

(5) The optical scanner according to mode (4), wherein the first scanning device performs a horizontal scan allowing the light to be scanned horizontally, and wherein the second scanning device performs a vertical scan allowing the light to be scanned in a direction intersecting with respect to a horizontal scan line.

As described above, in general, there are performed on a scanned plane on which light is scanned, a horizontal scan for scanning light horizontally, and a vertical scan for scanning light in a direction intersecting with respect to a horizontal scan line. On the scanned plane, during per scan cycle, the horizontal scan is repeated frequently, while the vertical scan is repeated less frequently than the horizontal scan. For these reasons, during such a scanning operation, the horizontal scan more strongly requires an increase in scan rate than the vertical scan.

In this optical scanner, the horizontal scan, which, as described above, more strongly requires an increase in scan rate than the vertical scan, is achieved with the first scanning device, which more easily allows fast scan than the second scanning device.

(6) The optical scanner according to mode (4) or (5), wherein the first and second scanning devices scan the light using respective resonance phenomena of the first and second mirror portions.

This optical scanner would easily allow an increase in scan frequency and stabilization in actual scan frequency, of each scanning device, compared with when any of the "first scanning device" and the "second scanning device" in the optical scanner according to the previous mode (4) or (5) is adapted to scan light without using a resonance phenomenon of a corresponding one of the first and second mirror portions.

The optical scanner according to the previous mode (4) or (5), however, may be practiced in an arrangement in which only one of the "first scanning device" and the "second scanning device" scans light using a resonance phenomenon of a corresponding one of the mirror portions.

(7) The optical scanner according to mode (4) or (5), wherein the first scanning device scans the light using a resonance phenomenon of the first mirror portion, while the second scanning device scans the light without using a resonance phenomenon of the second mirror portion.

This optical scanner would easily allow an increase in scan frequency and stabilization in actual scan frequency, of the first scanning device, compared with when the "first scanning device" in the optical scanner according to the previous mode (4) or (5) is adapted to scan light without using a resonance phenomenon of a corresponding one of the first mirror portion.

(8) The optical scanner according to any one of modes (1) through (7), wherein the second reflective surface has a dimension in a direction of the second oscillation axis, which is equal to or larger than a dimension expressed by $$2 \cdot d \cdot \tan(\alpha/2),$$

where $\alpha$ denotes an oscillation angle of the light scanned with the first reflective surface, and d denotes a distance by which centers of the first and second reflective surfaces are spaced apart from each other, when the optical scanner is viewed in a direction perpendicular to the first and second reflective surfaces.

This optical scanner would allow selection of a dimension of the second reflective surface in a direction of the second oscillation axis, in accordance with the layout of the first and second scanning devices of the optical scanner, in consideration of oscillation angle $\alpha$ of the light scanned with the first reflective surface; and distance d by which centers of the first and second reflective surfaces are spaced apart from each other, when the optical scanner is viewed in a direction perpendicular to the first and second reflective surfaces.

(9) The optical scan according to any one of modes (1) through (8), further comprising a common housing accommodating the first and second scanning devices, wherein the housing includes:

an entrance-side transmissive portion allowing light to enter the first reflective surface from an outside; and an exit-side transmissive portion allowing light to exit the second reflective surface toward the outside.

In this optical scanner, the first and second scanning devices are accommodated in a housing in common to these scanning devices, and further, there is provided the entrance-side transmissive portion for light entering the first reflective surface, while there is provided the exit-side transmissive portion for light exiting the second reflective surface.

This optical scanner would therefore, because of the housing having its occluding capability, prevent unexpected entry of external light into the first and second scanning devices without passing through the entrance-side transmissive portion or the exit-side transmissive portion, resulting in easier minimization of disturbing-light-caused deterioration of an SN ratio of scanning light produced with the instant optical scanner.

Each of the "entrance-side transmissive portion" and the "exit-side transmissive portion" set forth in this mode may be formed as a hole opening in the housing, or may be formed by filling the opening hole with a light transmissive material such as glass.

(10) The optical scanner according to mode (9), wherein the entrance-side transmissive portion is smaller in size than the exit-side transmissive portion.

In the optical scanner according to the previous mode (9), light enters the first reflective surface along an optical path fixed in position, after passing through the entrance-side transmissive portion, while light exits the second reflective surface along an optical path variable in position, after passing through the exit-side transmissive portion. Consequently, the exit-side transmissive portion is required to be light transmissive over a region larger than that of the entrance-side transmissive portion. On the other hand, for any of these transmissive portions, allowing each transmissive portion to be light transmissive over an undesirably large region is likely to deteriorate an SN ratio of scanning light produced with the instant optical scanner.

In view of the above findings, the optical scanner according to this mode is adapted such that the entrance-side transmissive portion is smaller in size than the exit-side transmissive portion.

(11) The optical scanner according to any one of modes (1) through (10), wherein the first and second reflective surfaces are disposed in series in a direction in which the light travels in the optical scanner, in the order set forth above, so as to be coplanar with each other, the optical scanner further comprising a third reflective surface reflecting light, once exiting the first reflective surface toward the second reflective surface.

This optical scanner provides one form of the layout of the first and second scanning devices in accordance with the optical scanner according to any one of the previous modes (1) through (10).

It is added that, as an alternative form of the layout of the first and second scanning devices in accordance with the optical scanner according to any one of the previous modes (1) through (10), there exists, for example, a layout in which the first and second reflective surfaces are disposed on respective two opposing flat planes leaving a spatial clearance therebetween, such that light exiting the first reflective surface enters the second reflective surface without passing through a separate reflective surface.

(12) The optical scanner according to mode (11), wherein the first and second mirror portions are formed in a same substrate.

(13) The optical scanner according to mode (11) or (12), wherein the second mirror portion includes a portion overlapping the first scanning device when the optical scanner is viewed in a direction of the second oscillation axis.

This optical scanner would make it easier to arrange the first and second scanning devices closely in a direction of the first oscillation axis, than when the second mirror portion fails to include a portion overlapping the first scanning device. As a result, compactness of this optical scanner in a direction of the first oscillation axis, which is to say, a direction in which the first and second mirror portions are arranged, is more easily achieved than when the second mirror portion fails to include a portion overlapping the first scanning device.

(14) The optical scanner according to any one of modes (1) through (13), wherein the second scanning device further includes a stationary frame, and a connection connecting the second mirror portion with the stationary frame so as to allow the second mirror portion to angularly oscillate about the second oscillation axis, and wherein the second mirror portion includes a portion overlapping the connection when the optical scanner is viewed in a direction of the first oscillation axis.

This optical scanner would make it easier to arrange the second scanning device and the connection closely in a direction of the oscillation axis of the second mirror portion, than when the second mirror portion fails to include a portion overlapping the connection. As a result, compactness of this optical scanner in a direction of the oscillation axis of the second mirror portion, is more easily achieved than when the second mirror portion fails to include a portion overlapping the connection.

(15) The optical scanner according to any one of modes (1) through (14), further comprising a mirror support supporting the first and second mirror portions, wherein the mirror support includes a mounting portion at which the mirror support is to be detachably mounted on a receiver.

This optical scanner, when replacement of the first and second mirror portions is needed, would allow replacement of the mirror support supporting the first and second mirror portions, while letting the receiver lie. Therefore, for replacement of the first and second mirror portions, a reduction can be provided in the number of optical components which are not required to be replaced but which are unavoidably replaced together with the first and second mirror portions.

(16) The optical scanner according to mode (15), wherein the first scanning device further includes a first actuator for angularly oscillating the first mirror portion using a piezoelectric element, and wherein the second scanning device further includes a second actuator for angularly oscillating the second mirror portion using a piezoelectric element, the optical scanner comprising power terminals for supply of electric power to the first and second actuators.

This optical scanner would allow the first and second actuators and a power source for supplying power to the first and second actuator, to be separated using the power terminals provided to the instant optical scanner. Therefore, the first and second mirror portions and the power source can be formed in separate bodies, and this enables replacement of the mirror support without requiring replacement of the power source, when replacement of the first and second mirror portions is needed. Consequently, this optical scanner would avoid useless replacement of the power source which is not needed to be replaced.

(17) The optical scanner according to mode (16), wherein the mirror support is inserted into the receiver for attachment thereto, and wherein the power terminals are disposed at a leading one of both ends of the mirror support in a direction in which the mirror support is inserted into the receiver.

This optical scanner, as a result of insertion of the instant optical scanner into the receiver, allows the power terminals provided to the instant optical scanner, to be connected with terminals on the side of the power source, and then allows the power source to supply power to the first and second actuators within the instant optical scanner.

(18) The optical scanner according to any one of modes (15) through (17), further comprising a light-transmissive cover opposing the first and second mirror portions.

This optical scanner, owing to the light-transmissive cover, would hold the first and second mirror portions clean.

(19) The optical scanner according to any one of modes (15) through (18), further comprising the receiver.

This optical scanner, because of detachable attachment of the mirror support including the first and second mirror portions, to the receiver, would not require full replacement of the instant optical scanner, but merely require replacement of the mirror support, when replacement of the first and second mirror portions is needed.

(20) The optical scanner according to mode (19), wherein the receiver includes an insert groove allowing the mirror support to be inserted into the receiver, and wherein the mirror support is inserted into the insert groove for support by the receiver.

This optical scanner, as a result of insertion of the mirror support into the insert groove of the receiver, would allow the mirror support to be easily detachably attached with the receiver.

(21) The optical scanner according to mode (19) or (20), wherein the first scanning device further includes a first actuator for angularly oscillating the first mirror portion using a piezoelectric element, wherein the second scanning device further includes a second actuator for angularly oscillating the second mirror portion using a piezoelectric element, wherein the receiver includes first power terminals for supply of electric power to the first and second actuators, wherein the mirror support includes second power terminals for supply of electric power to the first and second actuators, and wherein the first and second power terminals are in electrical contact with each other with the mirror support being supported by the receiver.

This optical scanner would allow the first power terminals of the receiver and the second power terminals of the mirror support to be brought into electrical contact with each other, with the mirror support being supported by the receiver. Therefore, in this state, external supply of electrical power is enabled for driving the first and second mirror portions, to the first and second actuators of the mirror support.

(22) The optical scanner according to mode (20) or (21), wherein the receiver is provided with the insert groove in the form of a pair of insert grooves which are engaged with a pair of lateral portions of the mirror support which are opposite to each other in a direction orthogonal to an insertion direction allowing the mirror support to be inserted into the receiver.

This optical scanner, as a result of engagement of the pair of lateral portions of the mirror support, with the insert grooves of the receiver, would allow the insert grooves to support the mirror support to be supported at its pair of lateral portions.

(23) The optical scanner according to any one of modes (19) through (22), wherein the receiver includes a positioner positioning the mirror support with the mirror support being supported by the receiver.

This optical scanner would allow the mirror support to be located in a suitable position using the positioner of the receiver.

(24) A mirror unit including a scanning mirror scanning light, and a mirror support supporting the scanning mirror in a condition allowing the scanning mirror to scan the light, the mirror unit comprising:

a mounting portion which is detachably mounted on a mirror-unit receiver for detachably receiving the mirror unit.

An exemplary conventional apparatus for scanning light is disclosed in Japanese Patent Application Publication No. HEI 6-139387. This conventional apparatus is for optically reading barcodes by scanning light. This conventional apparatus principally includes: a scanner scanning light on a barcode, to thereby optically read the barcode; and a decoder decoding the barcode which has been read by the scanner.

In the above-described conventional apparatus, the scanner and the decoder are formed in separate bodies allowing them to be detachably attached with each other. Due to this, if only one of these scanner and decoder has been damaged, it merely requires replacement of only one of these scanner and decoder which has been damaged, without requiring full replacement of this apparatus.

In this conventional apparatus, however, a power source and many optical components such as a light source, a reflective mirror, etc. are included within the scanner. If full replacement of the scanner is, therefore, unavoidable in spite that there is required replacement of the reflective mirror due to damage thereto, but there is not required replacement of the power source, the light source, etc. because of no damage thereto, the undamaged power source and many optical components such as the light source, etc. are replaced together with the damaged reflective mirror. For this reason, this conventional apparatus suffers from useless replacement of the power source and many optical components such as the light source, etc. which do not require replacement.

To solve the above drawbacks, the mirror unit according to this mode is provided to achieve the object that, when there is required replacement of the scanning mirror, additional optical components which are unavoidably replaced together with the scanning mirror are reduced in number.

The mirror unit according to this mode is a mirror unit including a scanning mirror scanning light, and a mirror support supporting the scanning mirror in a condition allowing the scanning mirror to scan the light, the mirror unit including a mounting portion which is detachably mounted on a mirror-unit receiver for detachably receiving the mirror unit.

This mirror unit, in which the mirror support is separable from the mirror-unit receiver, would therefore allow replacement of only the mirror unit, while letting the mirror-unit receiver lie, when replacement of the scanning mirror is required. Consequently, this mirror unit would allow a reduction in number of optical components which do not require replacement but which are unavoidably replaced together with the scanning mirror, when the scanning mirror requires replacement.

(25) The mirror unit according to mode (24), further comprising:

an actuator actuating the scanning mirror for scan; and a power-supplied terminal supplying power to the actuator.

This mirror unit allows the actuator and a power source for supply of power to be separable from each other, via the power-supplied terminal provided to the instant mirror unit. Therefore, the scanning mirror, which is capable of being formed in a separate body from the power source, enables, when there is required replacement of the scanning mirror, replacement of only the mirror unit without replacement of the power source requiring no replacement. This mirror unit would therefore avoid useless replacement of the power source requiring no replacement.

(26) The mirror unit according to mode (25), wherein the power-supplied terminal is disposed at a leading one of both ends of the mirror unit in a direction in which the mirror unit is inserted into the mirror-unit receiver.

This mirror unit, as a result of insertion of the instant mirror unit into the mirror-unit receiver, allows the power-supplied terminal provided to the instant mirror unit, to be connected with a terminal on the side of the power source, and then allows the power source to supply power to the actuator within the mirror unit.

(27) The mirror unit according to any one of modes (24) through (26), further comprising a light-transmissive cover opposing the scanning mirror.

This mirror unit, owing to the light-transmissive cover, would hold the scanning mirror clean.

(28) An optical scanner comprising the mirror unit according to any one of modes (24) through (27), further comprising the mirror-unit receiver set forth in any one of modes (24) through (27).

This optical scanner, because of detachable attachment of the mirror support including the scanning mirror, to the mirror-unit receiver, would not require full replacement of the instant optical scanner, but merely require replacement of the mirror unit, when replacement of the scanning mirror is needed.

(29) The optical scanner according to mode (28), wherein the mirror-unit receiver includes an insert groove formed in the mirror-unit receiver, and wherein the mirror unit is inserted into the insert groove for support by the mirror-unit receiver.

This optical scanner, as a result of insertion of the mirror unit into the insert groove of the mirror-unit receiver, would allow the mirror unit to be easily detachably attached with the mirror-unit receiver.

(30) The optical scanner according to mode (29), wherein the mirror-unit receiver is provided with the insert groove in the form of a pair of insert grooves which are engaged with a pair of lateral portions of the mirror unit which are opposite to each other in a direction orthogonal to an insertion direction allowing the mirror unit to be inserted into the insert grooves.

This optical scanner, as a result of engagement of the pair of lateral portions of the mirror unit, with the insert grooves of the mirror-unit receiver, would allow the insert grooves to support the mirror unit to be supported at its pair of lateral portions.

(31) The optical scanner according to any one of modes (28) through (30), wherein the mirror unit includes an actuator actuating the scanning mirror for scan, and a power-supplied terminal for supply of electrical power to the actuator, wherein the mirror-unit receiver includes a power-supplying terminal for supply of electrical power to the actuator, and wherein the power-supplying terminal is in electrical contact with the power-supplied terminal, with the mirror unit being supported by the mirror-unit receiver.

This optical scanner would allow the power-supplying terminal of the mirror-unit receiver and the power-supplied terminal of the mirror unit to be brought into electrical contact with each other, with the mirror unit being supported by the mirror-unit receiver. Therefore, in this state, external supply of electrical power is enabled for driving the scanning mirror, to the actuator of the mirror unit.

(32) The optical scanner according to any one of modes (28) through (31), wherein the mirror-unit receiver includes a positioner positioning the mirror unit with the mirror unit being supported by the mirror-unit receiver.

This optical scanner would allow the mirror unit to be located in a suitable position using the positioner of the mirror-unit receiver.

(33) The optical scanner according to mode (32), wherein the positioner includes a first pressing member pressing the mirror unit in a direction orthogonal to a direction allowing the mirror unit to be inserted into the mirror-unit receiver, to thereby position the mirror unit supported by the mirror-unit receiver, with respect to the orthogonal direction.

This optical scanner would allow the mirror unit to be positioned with respect to a direction orthogonal to the insertion direction of the mirror unit, using the first pressing member.

(34) The optical scanner according to mode (32) or (33), wherein the positioner includes a second pressing member pressing the mirror unit in an insertion direction allowing the mirror unit to be inserted into the mirror-unit receiver, to thereby position the mirror unit supported by the mirror-unit receiver, with respect to the insertion direction.

This optical scanner would allow the mirror unit to be positioned with respect to the insertion direction of the mirror unit, using the second pressing member.

(35) The optical scanner according to any one of modes (32) through (34), wherein the positioner includes a third pressing member pressing the mirror unit in a direction in which a reflective surface of the scanning mirror is oriented, to thereby position the mirror unit.

This optical scanner would allow the mirror unit to be positioned with respect to a direction in which the reflective surface of the scanning mirror is oriented (e.g., a direction normal to the reflective mirror).

(36) The optical scanner according to mode (32), wherein the positioner includes a pressing member for locating the mirror unit under pressure, the pressing member being made up of an elastic material absorbing vibration of the mirror unit with the mirror unit being support by the mirror-unit receiver.

This optical scanner allows the mirror unit to be more stably supported, because the vibration of the mirror unit is absorbed by the pressing member for locating the mirror unit under pressure, which is made up of elastic material.

(37) The optical scanner according to any one of modes (28) through (36), further comprising a fixing member fixing the mirror unit to the mirror-unit receiver, with the mirror unit being supported by the mirror-unit receiver.

This optical scanner allows the mirror unit to be fixed to the mirror-unit receiver via the fixing member.

(38) The optical scanner according to mode (37), wherein the fixing member functions also as a second pressing member pressing the mirror unit in an insertion direction allowing the mirror unit to be inserted into the mirror-unit receiver, to thereby position the mirror unit supported by the mirror-unit receiver, with respect to the insertion direction.

This optical scanner allows the mirror unit to be fixed, with the mirror unit being positioned with respect to the insertion direction of the mirror unit, using the fixing member functioning also as a second pressing member.

(39) An image forming apparatus comprising a modulated-light emitter modulating light in accordance with image information, and emitting the modulated light; and an optical scanning device scanning the modulated light for displaying an image, wherein the optical scanning device includes the optical scanner according to any one of modes (28) through (38).

This image forming apparatus provides an apparatus for forming images using the optical scanner according to any one of the previous modes (28) through (38).

(40) An image forming apparatus forming an image by scanning a beam of light, comprising:

a light source emitting the beam of light; and the optical scanner according to any one of modes (1)through (23), that two-dimensionally scans the beam of light emitted from the light source for forming the image.

This image forming apparatus allows the formation of images using an optical scanner facilitating co-fulfillment of an increase in scan frequency of the beam of light emitted from the light source, and a reduction in size.

(41) The image forming apparatus according to mode (40), wherein the beam of light emerging from the optical scanner enters an image-formed plane on which the image is formed, without passing through any relay optical systems.

This image forming apparatus would make it easier to achieve a reduction in number of components of the instant image-forming-apparatus and simplification in an assembling work, than when the beam of light emerging from the optical scanner enters the image-formed plane through a relay optical system.

(42) The image forming apparatus according to mode (40) or (41), wherein the beam of light emerging from the optical scanner enters a retina of an eye, whereby the image is projected onto the retina.

Several presently preferred embodiments of the invention will be described in more detail by reference to the drawings in which like numerals are used to indicate like elements throughout.

Figure 3:
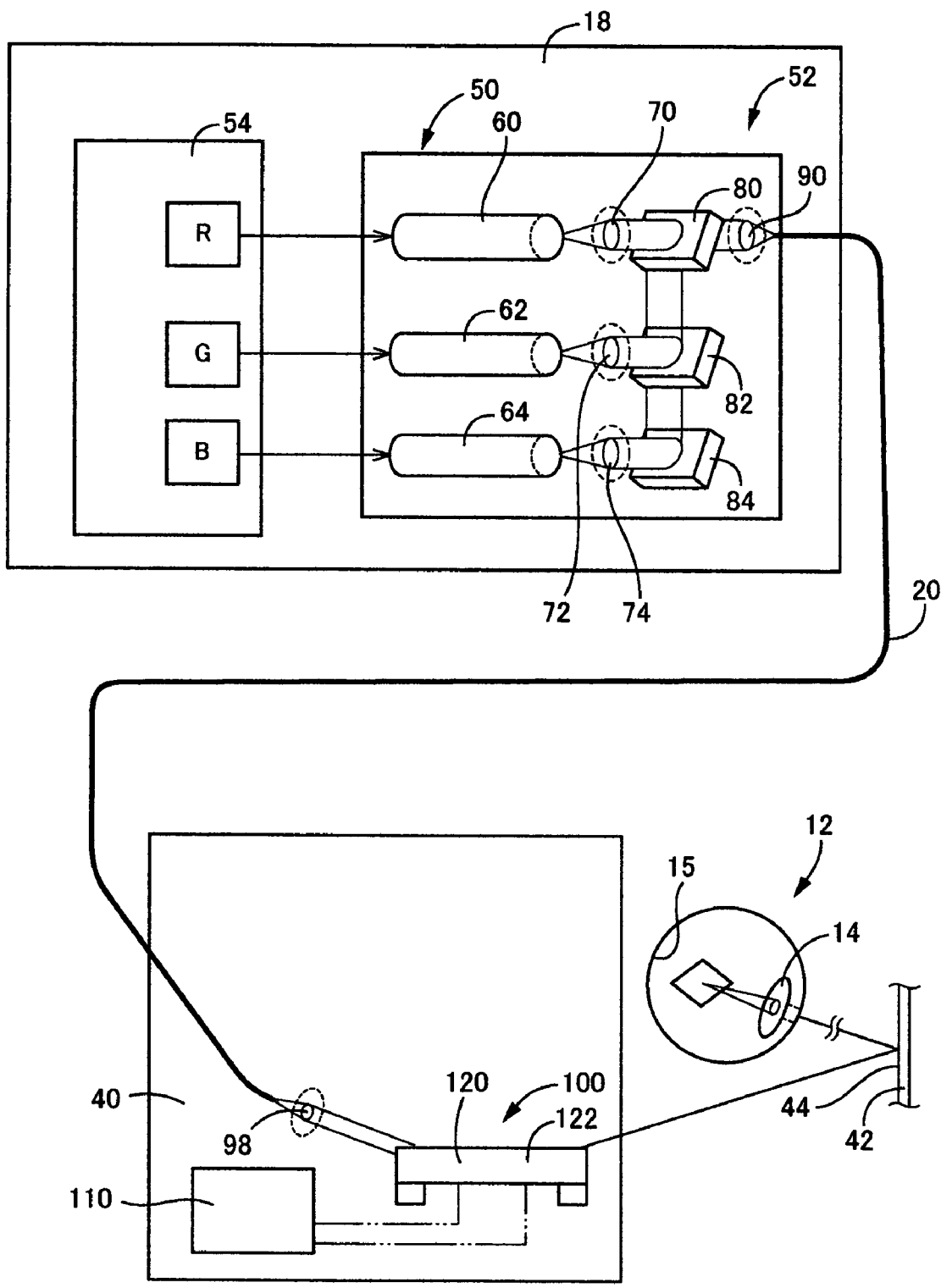
FIG. 3 is a schematic view illustrating the retinal scanning display device 10 depicted in FIG. 1.

FIG. 1 illustrates schematically the exterior of a head-mounted type retinal scanning display device 10 (hereinafter, referred to as "RSD") constructed in accordance with a first embodiment of the present invention. This RSD 10 is adapted to project a beam of light onto a viewer's retina through a pupil of a viewer's eye, and to scan the beam of light on the retina, to thereby directly project an image onto the retina. In FIG. 3, reference numerals 12, 14 and 15 denote the eye, the pupil, and the retina, respectively. In the present embodiment, the retina 15 is an example of the "image-formed plane" set forth in the above mode (16).

As illustrated in FIG. 1, the RSD 10 includes amounted subsystem 16 mounted on a viewer's head in use, and a light source unit 18 worn on the viewer, both of which are physically separate from each other. The mounted subsystem 16 and the light source unit 18 are optically coupled with each other via a flexible optical fiber 20 as a light transmissive medium. In use, the light source unit 18 is, for example, worn on the waist or the back of the viewer, using a fixture such as a belt.

As illustrated in FIG. 1, the mounted subsystem 16 is of an eyeglasses-type which is held at the viewer's head using the nose and both ears of the viewer, as with conventional eyeglasses. To this end, the mounted subsystem 16 includes: a frame 30 supported by the nose of the viewer, located in front of viewer's both eyes 12, 12; and right- and left-handed temples 32, 32 supported by both ears at both sides of the viewer's head, respectively. The frame 30 and each temple 32, 32 are foldably hinged with each other.

The RSD 10 is of a type allowing images to be projected onto the retinas 15 of both eyes 12, 12, respectively. To this end, the mounted subsystem 16 includes separate optical systems for both eyes 12, 12, respectively. More specifically, the mounted subsystem 16 includes per each eye 12: a scan unit 40 for scanning a beam of light; and a projection device 42 for allowing the scanned beam of light to enter a corresponding eye 12 for projection onto the retina 15. The mounted subsystem 16 is coupled at the scan unit 40 with the optical fiber 20. That is to say, in the present embodiment, the scan unit 30 and the light source unit 18 are optically coupled with each other via the optical fiber 20.

Figure 2:
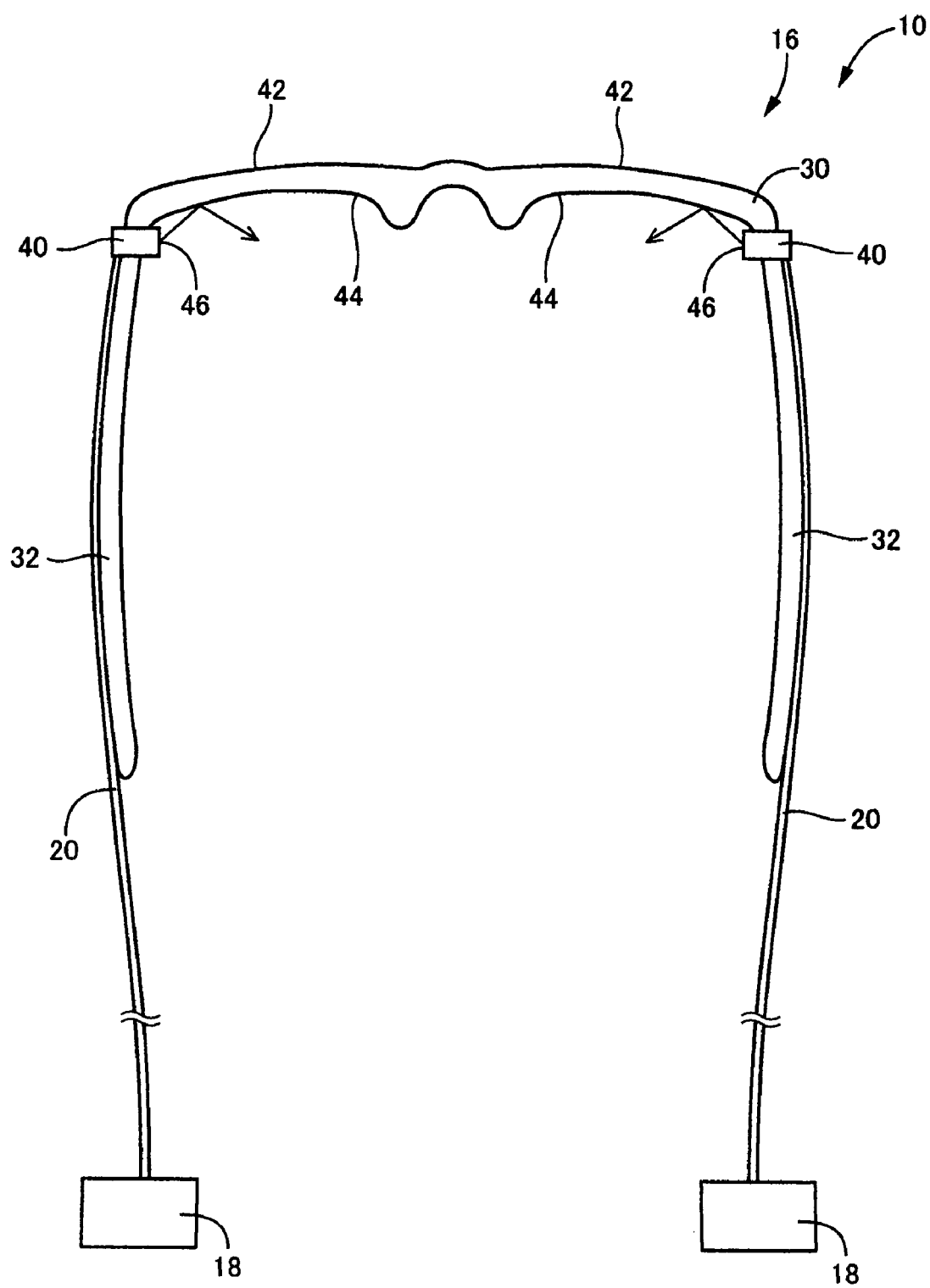
FIG. 2 is a top plan view illustrating the retinal scanning display device 10 depicted in FIG. 1.

As illustrated in FIG. 2, the projection device 42, in the present embodiment, is of a reflection-type which reflects a beam of light scanned by the scan unit 40, into the retina 15. More specifically, the projection device 42 is made up of a semi-transparent mirror similar in shape to each lens of conventional eyeglasses. In the projection device 42, its surface facing the viewer is a reflective surface 44 which, as illustrated in FIG. 3, reflects a beam of light entering from the scan unit 40, into the eye 12.

The reflective surface 44 is in the shape of an ellipsoidal surface of revolution formed by rotating a part of an ellipse about a horizontal axis. The reflective surface 44 has two foci, and, as illustrated in FIG. 2, an exit 46 of the scan unit 40 which a beam of light exits is located to coincide with one of these two foci, while the eye 12 is located to coincide with the other of these two foci, with the mounted subsystem 16 being mounted on the head.

The projection device 42, in addition to being reflective as described above, is transmissive to light which enters the projection device 42 from the front, for allowing entry of the light into the eye 12. Therefore, the viewer is allowed to visually perceive an image delivered from the RSD 10, with the image being superimposed on a real scene in front of the viewer, which is seen through the projection device 42. However, it is inessential in practicing the present invention to make up the projection device 42 using a semi-transparent mirror, and the projection device 42 may be alternatively made up of an optical component which is reflective but is not transmissive.

As is evident from the above explanation, in the present embodiment, sets of the scan unit 40 and the projection device 42 are provided for both eyes 12, 12, respectively, and accordingly, sets of the light source unit 18 and the optical fiber 20 are also provided for both eyes 12, 12, respectively. The light source unit 18, however, may be physically in the form of a single light source unit common to both eyes 12, 12.

FIG. 3 illustrates in optical path diagram the light source unit 18, optical fiber 20, and the scan unit 40 for a representative one of both eyes 12, 12.

The light source unit 18 is constructed so as to include a light source subsystem 50, a focusing subsystem 52, and a main control circuit 54. In order to reproduce any desired color in RGB format, the light source subsystem 50 includes a laser device 60 generating a red colored laser beam, a laser device 62 generating a green colored laser beam, and a laser device 64 generating a blue colored laser beam. The intensities of the laser beams generated from the laser devices 60, 62, and 64 are controlled by the main control circuit 54, on a pixel-by-pixel basis, in accordance with an image signal representative of an image to be projected onto the retina 15.

In addition, the focusing subsystem 52 is disposed for focusing three laser beams generated from the three respective laser devices 60, 62, and 64, and is constructed, for example, to include per each laser device 60, 62, 64: collimator lenses 70, 72, and 74 for collimating the generated laser beams; and dichroic mirrors 80, 82, and 84. The focused laser beam by the focusing subsystem 52 is converged by the converging lens 90, and the converged laser beam enters the scan unit 40 through the optical fiber 20.

As illustrated in FIG. 3, the scan unit 40 includes: a collimator lens 98 for collimating a laser beam exiting the optical fiber 20; and an optical scanner 100 for two-dimensionally scanning a laser beam exiting the collimator lens 98, in horizontal and vertical scan directions. In the present embodiment, the collimator lens 98 allows a laser beam to enter the optical scanner 100 in parallel light. A laser beam, upon exiting the optical scanner 100, enters the reflective surface 44 of the projection device 42 without passing through any relay lenses, and is then reflected therefrom into the retina 15. The relay lens is an example of the "relay optical system" set forth in the above mode (16).

As illustrated in FIG. 3, with the optical scanner 100, a drive circuit 110 is electrically connected. The drive circuit 110 drives the optical scanner 100 in response to a drive signal supplied from the main control circuit 54 via the optical fiber 20 or via an electric wire as a separate path from the optical fiber 20. The optical scanner 100 includes a horizontal scanning subsystem 120 and a vertical scanning subsystem 122, both of which are driven by the drive circuit 110.

Figure 4:
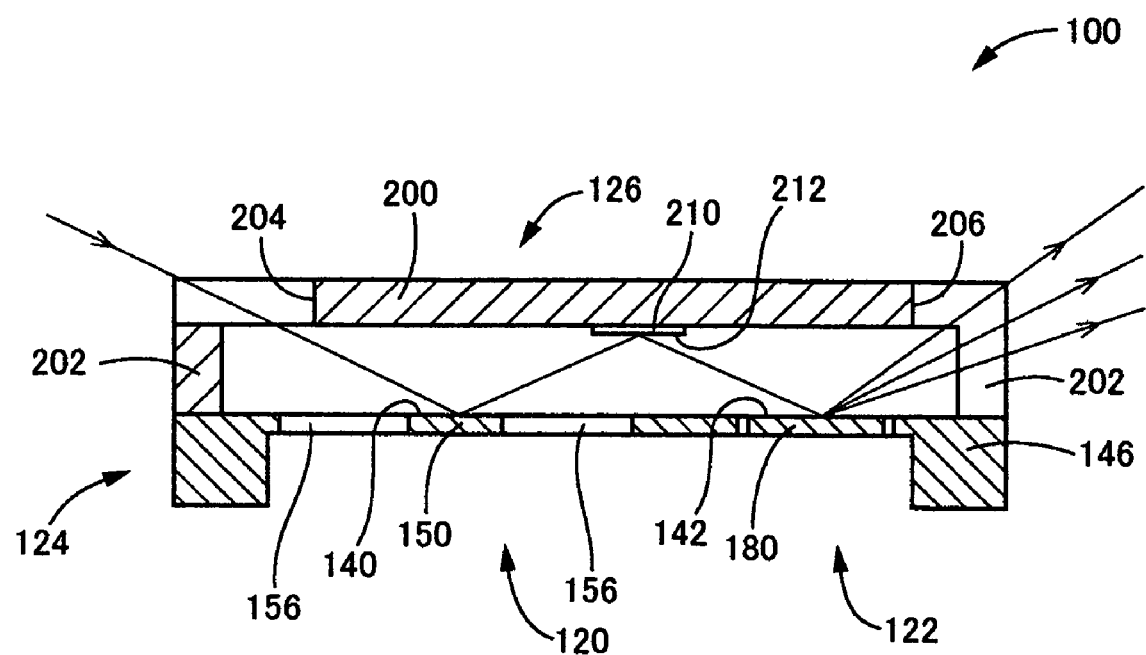
FIG. 4 is a longitudinal sectional view illustrating an optical scanner 100 in FIG. 3.

FIG. 4 illustrates the optical scanner 100 in longitudinal cross section. The optical scanner 100 is constructed with the surface of an oscillating body 124 being covered with a cover 126.

Figure 5:
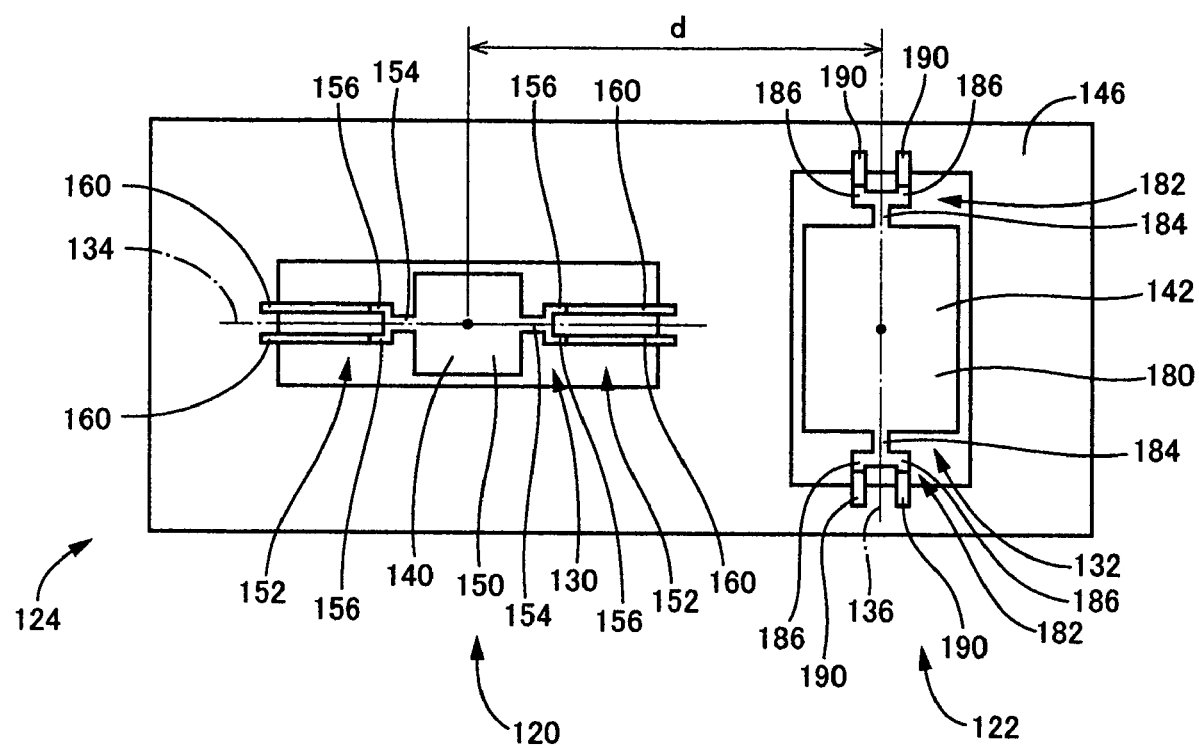
FIG. 5 is a top plan view illustrating an oscillating body 124 in FIG. 4.

FIG. 5 illustrates the oscillating body 124 in top plan view. The oscillating body 124 is formed using a base material in the form of a silicon wafer having a thickness of about 100 μm. By etching the base material, first and second oscillating portions 130, 132 are monolithically fabricated on the oscillating body 124. The first and second oscillating portions 130, 132 are formed on the oscillating body 124 in a coplanar array. That is to say, in the present embodiment, the first and second oscillating portions 130, 132 are integrally formed in a planar configuration (configuration in which a plurality of structural elements are disposed in a coplanar relationship).

The first oscillating portion 130 is excited to vibrate in a resonant condition for its rotary oscillation about a first oscillation axis 134 for a horizontal scan of a laser beam impinging on the optical scanner 100. On the other hand, the second oscillating portion 132 is excited to vibrate in a resonant condition for rotary oscillation about a second oscillation axis 136 for a vertical scan of a laser beam exiting the first oscillating portion 130.

As illustrated in FIG. 5, on the first and second oscillating portions 132, there are formed first and second reflective surfaces 140, 142, respectively, in a coplanar array in which first and second reflective surfaces 140, 142 are positioned parallel to the surface of the oscillating body 124 in a non-active state of the optical scanner 100. The first reflective surface 140 is disposed on an upstream side of a direction in which a laser beam travels within the optical scanner 100, while the second reflective surface 142 is disposed on a downstream side. The center of the second reflective surface 142 is spaced a distance D apart from the center of the first reflective surface 140 in a direction perpendicular to the second oscillation axis 136, which is to say, a direction parallel to the first oscillation axis 134. In the optical scanner 100, the center of the second reflective surface 142 is provided on the first oscillation axis 134.

In the present embodiment, the first oscillation axis 134 is positioned with respect to the first oscillating portion 130 so as to allow the first oscillation axis 134 to be oriented parallel to a direction of a laser beam impinging on the optical scanner 100. On the other hand, the second oscillation axis 136 is positioned with respect to the second oscillating portion 132 so as to allow the second oscillation axis 136 to be oriented perpendicular to a direction of a laser beam impinging on the optical scanner 100. As a result, the first and second oscillation axes 134, 136 are positioned orthogonal relative to each other.

As illustrated in FIG. 5, the oscillating body 124 includes oscillating sections and a non-oscillating section. The oscillating sections are the first and second oscillating portions 130, 132, and the non-oscillating section is a stationary frame 146 disposed so as to surround the first and second oscillating portions 130, 132. The oscillating body 124 is mounted at the stationary frame 146 on the cover 126.

Figure 6:
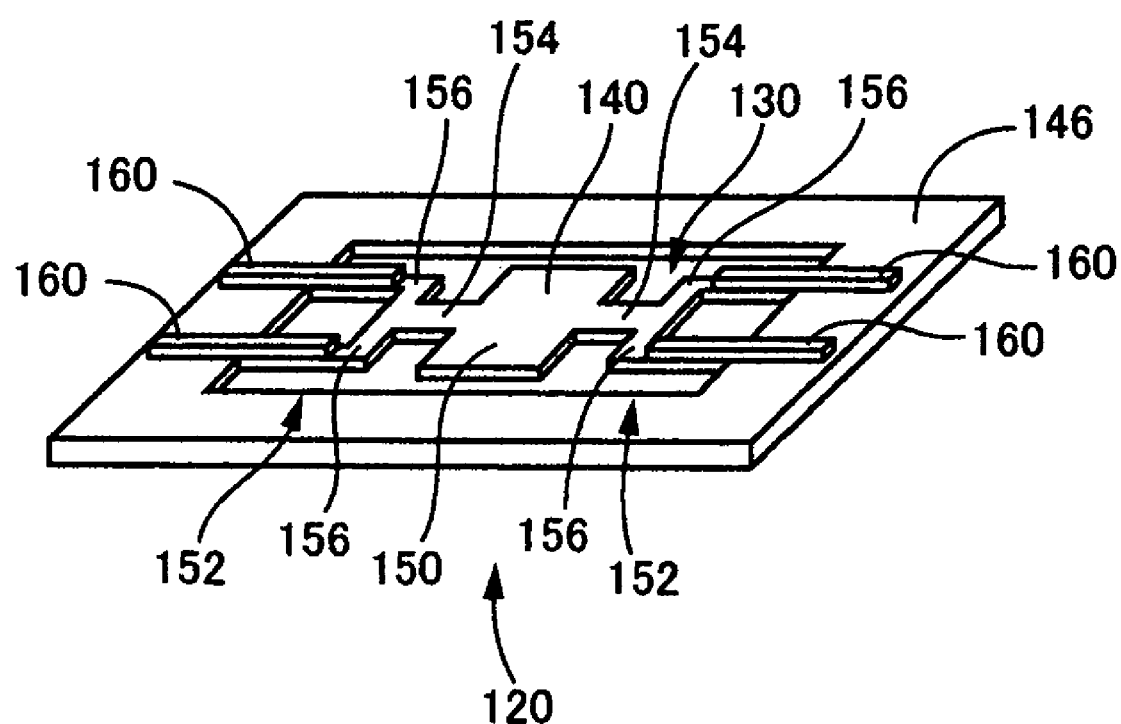
FIG. 6 is a perspective view illustrating a horizontal scanning subsystem 120 in FIG. 5.

FIG. 6 illustrates the first oscillating portion 130 in enlarged perspective view, and further illustrates a fragment of the stationary frame 146 in association with the first oscillating portion 130. As illustrated in FIG. 6, the first oscillating portion 130 includes a first mirror portion 150 in which the first reflective surface 140 is formed. From the opposite ends of the first mirror portion 150, a pair of beam portions 152, 152 extend in opposite directions to each other. The first oscillating portion 130 is constructed by coupling the first mirror portion 150 with the stationary frame 146 via the pair of beam portions 152, 152. The pair of beam portions 152, 152 are both disposed on the first oscillation axis 134, and are opposed to each other with the first mirror portion 150 being interposed therebetween.

In each beam portion 152, a single first leaf spring 154 extends from the first mirror portion 150, and is bifurcated to form two second leaf springs 156, 156 extending from the first leaf spring 154 toward the stationary frame 146. In each beam portion 152, two actuators 160, 160 are attached to the two second leaf springs 156, 156 at their single-sided faces, respectively.

Figure 7:
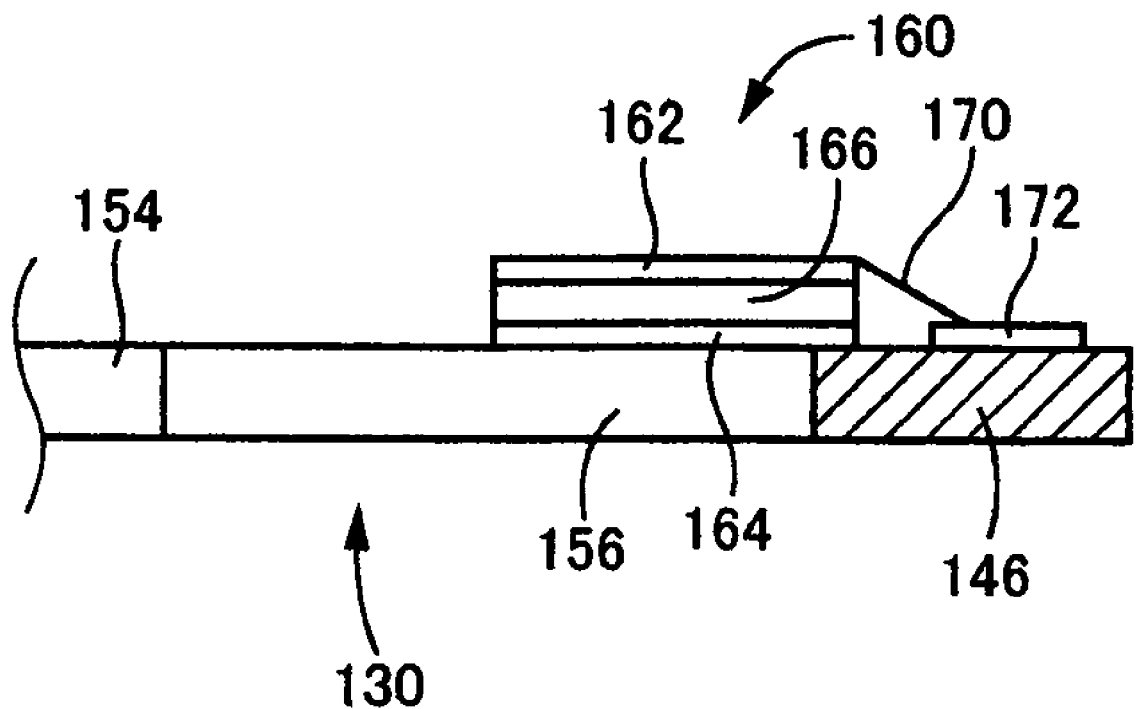
FIG. 7 is a longitudinal sectional view illustrating an actuator 160 and its periphery in FIG. 6.

As illustrated in FIG. 7, each actuator 160 extends along the corresponding second leaf spring 156. Each actuator 160 is in the shape of a sandwich in which a piezoelectric element 166 is interposed between upper and lower electrodes 162, 164 which coextend in parallel to each actuator 160. From the upper and lower electrodes 162, 164, lead wires 170 extend, respectively, and are connected with each of terminals 172 disposed on the stationary frame 146. FIG. 7, however, illustrates only the representative ones of the lead wires 170 and the terminals 172 for the upper electrode 162.

In each thus-structured actuator 160, application of a voltage to the piezoelectric element 166 in a direction perpendicular to its lengthwise direction causes the piezoelectric element 166 to produce its lengthwise distortion (expansion or contraction), while inducing deflection (flexure) of the corresponding second leaf spring 156.

In the present embodiment, voltages opposite in phase are applied to a pair of piezoelectric elements 166, 166, for exciting the piezoelectric elements 166, 166 to distort in opposite phase, wherein the pair of piezoelectric elements 166, 166 are attached to two of the second leaf springs 156, 156, respectively, which are located on the same side with respect to the first mirror portion 150. As a result, the pair of piezoelectric elements 166, 166 excite the first leaf spring 154 to produce a moment with a direction causing the first leaf spring 154 to rotate unidirectionally about the first oscillation axis 134.

As illustrated in FIG. 6, the first oscillating portion 130 employs the total four actuators 160, and two of which confront each other with the first mirror portion 150 being interposed therebetween, are actuated in identical phase. As a result, the four actuators 160 are each excited to rotate the first mirror portion 150 in a common direction about the first oscillation axis 134.

Although the construction of the first oscillating portion 130 has been described above, the second oscillating portion 132, as illustrated in FIG. 5, is basically common in construction to the first oscillating portion 130. That is to say, in the second oscillating portion 132, a second mirror portion 180 in which a second reflective surface 142 is formed is coupled to the stationary frame 146 via a pair of beam portions 182, 182 which coextend from the opposite sides of the second mirror portion 180, in opposite directions, along the second oscillation axis 136. In each beam portion 182, a single first leaf spring 184 extends from the second mirror portion 180 toward the stationary frame 146, and is bifurcated to form two second leaf springs 186, 186 which coextend from the first leaf spring 184 to the stationary frame 146.

For the second oscillating portion 132, similarly, in each beam portion 182, two actuators 190 are attached to the two second leaf springs 186, 186 at their single-sided faces, respectively. FIG. 5 illustrates in top plan view the second oscillating portion 132 with the four actuators 190 being attached thereto. Each actuator 190, although not illustrated, is in the shape of a sandwich in which a piezoelectric element is interposed between upper and lower electrodes which coextend along the corresponding second leaf spring 186, as with the actuator 160. Each actuator 190 excites the second mirror portion 180 of the second oscillating portion 132 to angularly oscillate using the same principle as the principle used for exciting the first mirror portion 150 of the first oscillating portion 130 to angularly oscillate.

In the present embodiment, one frame of an image to be projected onto the retina 15 is formed with a plurality of horizontal scan lines, and a plurality of vertical scan lines which the plurality of horizontal scan lines intersect and which are fewer than the horizontal scan lines. However, not all the scan lines are visualized, and the retrace blanking is performed for the scan lines as desired. For this reason, a horizontal scan is required to scan a laser beam at a higher rate or a higher frequency, while a vertical scan is required to scan a laser beam at a lower rate or a lower frequency. On the other hand, the larger a moment of inertia ($=mr^2$) of each first mirror portion 150, 180 about each oscillation axis 134, 136, the more easily the scan frequency of each first mirror portion 150, 180 is reduced.

Therefore, in the present embodiment, as illustrated in FIG. 5, the second mirror portion 180 of the second oscillating portion 132 for vertical scan is dimensioned to be larger in a direction (rotation radial direction) perpendicular to the oscillation axis 134, 136 than the first mirror portion 150 of the first oscillating portion 130 for horizontal scan.

As illustrated in FIG. 5, in the present embodiment, the second mirror portion 180 of the second oscillating portion 132 for vertical scan is dimensioned to be larger also in the direction of the oscillation axis 134, 136 than the first mirror portion 150 of the first oscillating portion 130 for horizontal scan. The establishment of a dimension L of the second oscillating portion 132 in the direction of the second oscillation axis 136 will be described in greater detail below.

Figure 8:
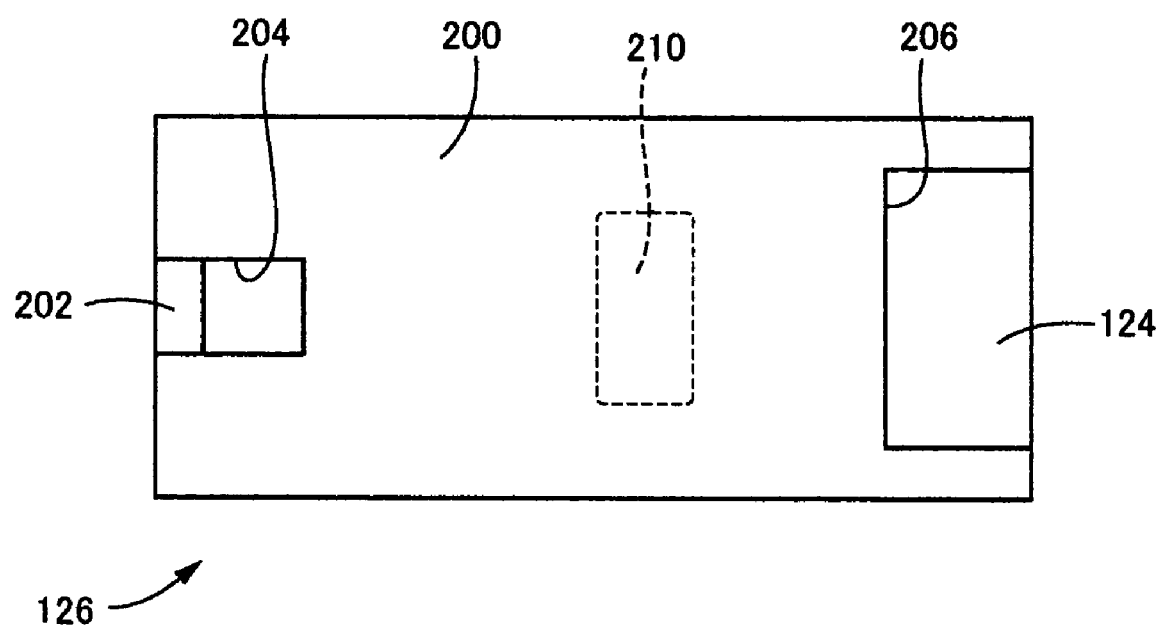
FIG. 8 is a top plan view illustrating a cover 126 in FIG. 4.

FIG. 4 illustrates the cover 126 in sectional side view. The cover 126 is constructed such that a vertical wall portion 202 extends from a circumferential edge of a plate portion 200. FIG. 8 illustrates the cover 126 in top plan view. The cover 126 includes an entrance-side transmissive portion 204 allowing a laser beam to enter from the outside, while the cover 126 includes an exit-side transmissive portion 206 allowing a laser beam to exit toward the outside. In the present embodiment, the entrance-side and exit-side transmissive portions 204, 206 are each in the form of a through hole not being filled inside. The entrance-side transmissive portion 204 is formed in the plate portion 200 of the cover 126 at its one end, while the exit-side transmissive portion 206 is formed in the plate portion 200 and the vertical wall portion 202 of the cover 126 at its remaining end.

In the present embodiment, a laser beam impinges obliquely and acutely on the first oscillating portion 130 through the entrance-side transmissive portion 204, while a laser beam exits obliquely and acutely the second oscillating portion 132 through the exit-side transmissive portion 206.

As illustrated in FIGS. 4 and 8, a stationary mirror 210 is attached to a back face of the plate portion 200 which faces the first and second oscillating portion 130, 132. The stationary mirror 210 is fixedly attached at a fixed position. As illustrated in FIG. 4, the stationary mirror 210 is disposed generally at an intermediate point in a path extending from the first mirror portion 150 to the second mirror portion 180. The stationary mirror 210, by the use of its third reflective surface 212, reflects a laser beam exiting the first mirror portion 150 at an acute angle therewith, toward the second mirror portion 180 at an acute angle therewith.

Figure 9:
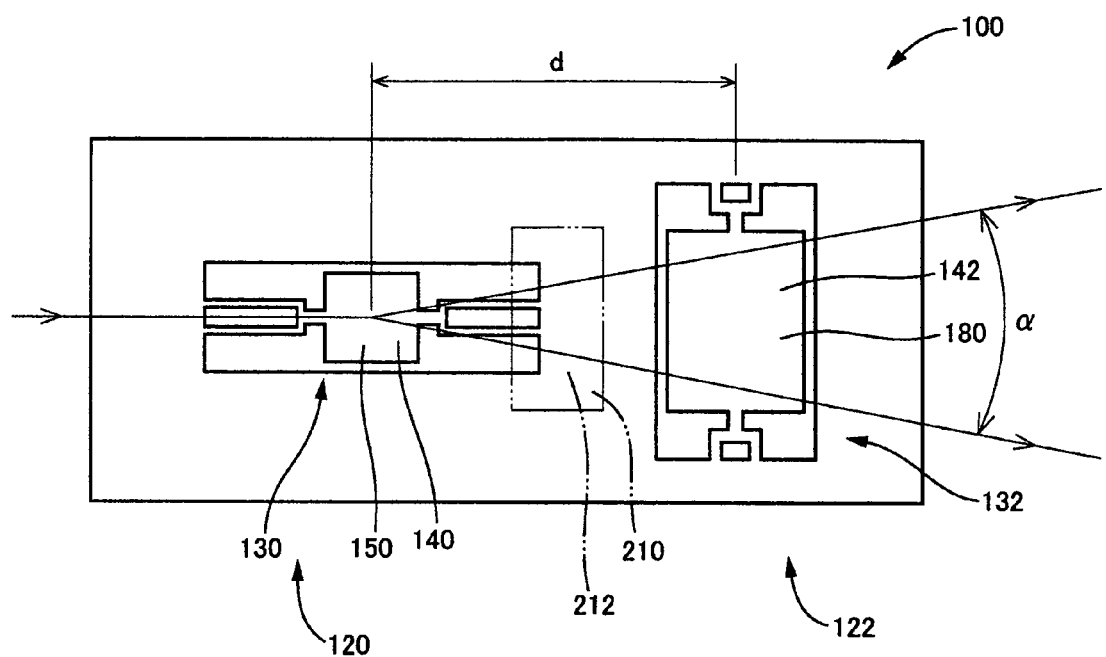
FIG. 9 illustrates in top plan view the optical scanner 100 depicted in FIG. 4 and illustrates in optical path diagram a laser beam deflected within the optical scanner 110.

FIG. 9 is illustrates in top plan view an optical path along which a laser beam travels from an entry event into to an exit event from the optical scanner 100. The laser beam, upon entry as parallel light, is scanned by the first mirror portion 150 in a horizontal direction (in an up-and-down direction as viewed in FIG. 9). The scanned laser beam is reflected from the stationary mirror 210, and then enters the second mirror portion 180. The entering laser beam is scanned by the second mirror portion 180 in a vertical direction (in a plane perpendicular to the sheet of FIG. 9).

Where α denotes an oscillation angle of a laser beam scanned with the first mirror portion 150, and d denotes a distance by which centers of the first and second reflective surfaces 140, 142 of the first and second mirror portions 150, 180 are spaced apart from each other, the dimension L of the second reflective surface 142 in the direction of the second oscillation axis 136 is set to a value equal to or larger than a dimension expressed by $$2 \cdot d \cdot \tan(\alpha/2)$$

As illustrated in FIG. 9, in the present embodiment, an optical path of a laser beam to be passed through the entrance-side transmissive portion 204 remains unchanged in position during a scanning operation by the optical scanner 100, while an optical path of a laser beam to be passed through the exit-side transmissive portion 206 changes in position during a scanning operation by the optical scanner 10, so as to draw a sector-shaped figure.

With emphasis on the differences in optical path between the entrance-side and exit-side transmissive portions 204, 206, in the present embodiment, the entrance-side transmissive portion 204 is made to be smaller in size than the exit-side transmissive portion 206, and additionally, the entrance-side and exit-side transmissive portions 204, 206 are each designed, with variations in manufactures and changes in temperature, etc., in mind, so as to have a minimum size allowing for a practically-required margin but not allowing for any additional margins. As a result, entry of disturbing light and dust into the optical scanner 100 through the entrance-side and exit-side transmissive portions 204, 206 is restricted.

As is evident from the above description, in the present embodiment, the first oscillating portion 130, a portion of the cover 126 pertinent to the first oscillating portion 130, the four actuators 160 pertinent to the first oscillating portion 130, and a portion of the drive circuit 110 which actuates the actuators 160 corporate to constitute the horizontal scanning subsystem 120. Further, the second oscillating portion 132, a portion of the cover 126 pertinent to the second oscillating portion 132, the four actuators 190 pertinent to the second oscillating portion 132, and a portion of the drive circuit 110 which actuates the actuators 190 corporate to constitute the vertical scanning subsystem 122.

As described above, in the present embodiment, the horizontal scanning subsystem 120, which is one of the horizontal and vertical scanning subsystems 120, 122, and which is disposed on an upstream side of a travel direction of a laser beam, is adapted such that its first oscillation axis 134 is positioned exactly parallel to an entry direction in which a laser beam enters the first reflective surface 140, when the optical scanner 100 is viewed perpendicularly to the first reflective surface 140 of the horizontal scanning subsystem 120. For the first oscillation axis 134, being exactly parallel to the entry direction is not essential, and being substantially parallel is adequate.

Therefore, the present embodiment, even if a spot of a laser beam formed on the first reflective surface 140 is deformed to be elongated due to oblique entry of the laser beam into the first reflective surface 140, would prevent a major axis of the spot from being oriented perpendicular with respect to the first oscillation axis 134 of the reflective surface 140. As a result, the selection of the shape of the first mirror portion 150 so as to fit such a spot would not require the dimension of the first mirror portion 150 in the rotation radial direction to be larger than that of the aforementioned exemplary conventional technique.

Accordingly, the present embodiment makes it easier to reduce a moment of inertia of the first mirror portion 150, eventually facilitating an increase in scan frequency of the first mirror portion 150. As a result, the present embodiment facilitates co-achievement of an increase in scan frequency and a reduction in size.

As is evident from the above description, in the present embodiment, the horizontal scanning subsystem 120 constitutes an example of the "first scanning device" set forth in the above mode (1), the vertical scanning subsystem 122 constitutes an example of the "second scanning device" set forth in the same mode, and the laser beam constitutes an example of the "light" set forth in the same mode.

Further, in the present embodiment, the four actuators 160, which actuate the first oscillating portion 130, each constitute an example of the "first actuator" set forth in the above mode (2), the four actuators 190, which actuate the second oscillating portion 132, each constitute an example of the "second actuator" set forth in the same mode, and the cover 126 constitutes an example of the "housing" set forth in the above mode (9).

Still further, in the present embodiment, the first and second reflective surfaces 140, 142 constitutes an example of the "first and second reflective surfaces" set forth in the above mode (11), and the third reflective surface 212 of the stationary mirror 210 constitutes an example of the "third reflective mirror" set forth in the same mode.

Additionally, in the present embodiment, the light source unit 18 constitutes an example of the "light source" set forth in the above mode (40), the scan unit 40 constitutes an example of the "optical scanner" set forth in the same mode, and the laser beam constitutes an example of the "light beam" set forth in the same mode.

It is added that, in the present embodiment, although the first and second mirror portions 150, 180 are both designed to exploit their resonance phenomena for laser beam scan, the present invention may be alternatively practiced in an arrangement in which the first mirror portion 150 exploits its resonance phenomenon for laser beam scan, while the second mirror portion 180 does not exploit its resonance phenomena for laser beam scan.

Next, there will be described a second embodiment of the present invention. The present embodiment, however, is in common in many elements to the first embodiment, while is different only in elements pertinent to an optical scanner from the first embodiment, and therefore, only the different elements of the present embodiment will be described in greater detail below, while the common elements of the present embodiment will be omitted in detailed description by reference using the identical reference numerals or names to those in the first embodiment.

Figure 10:
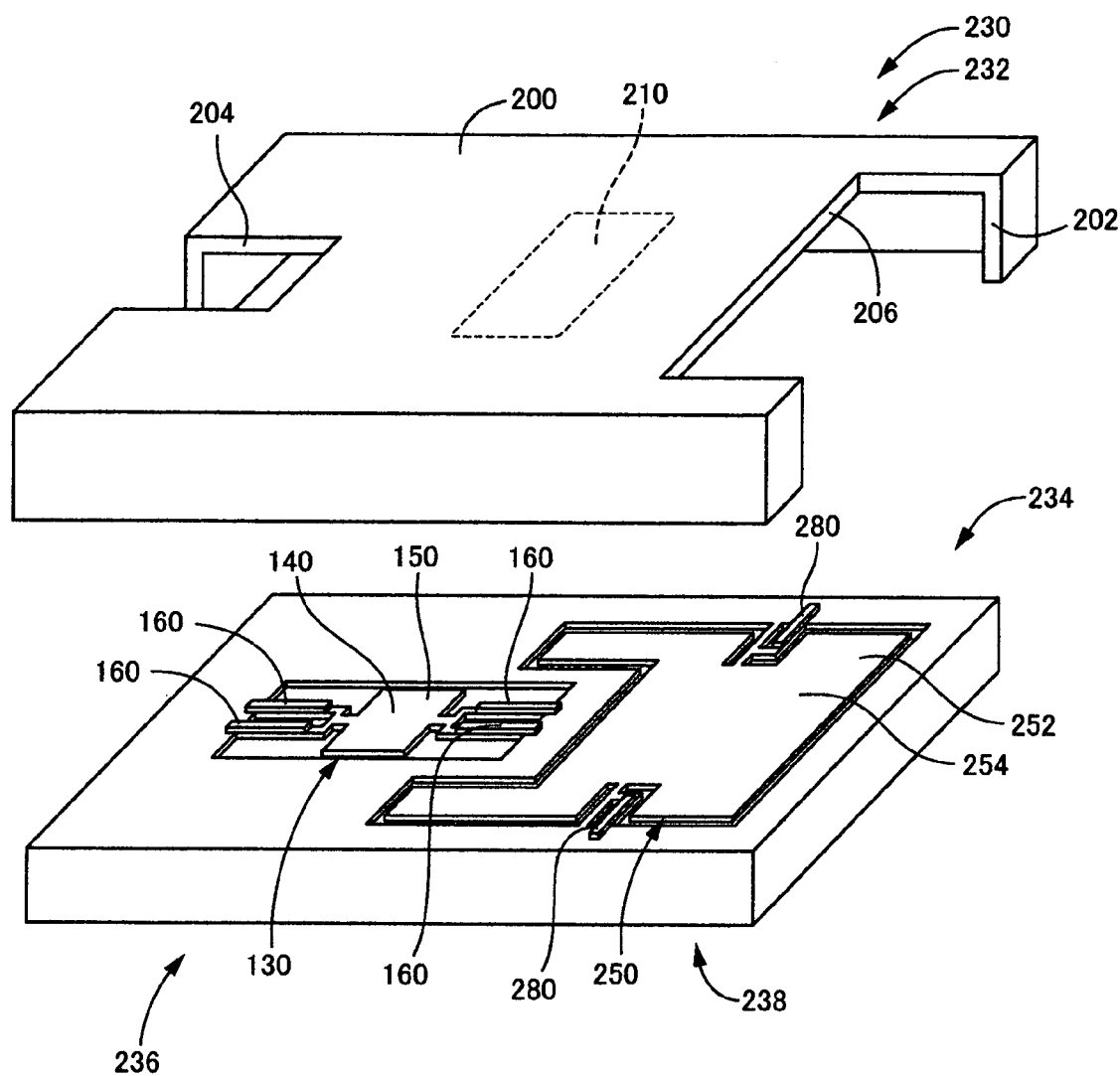
FIG. 10 is an exploded perspective view illustrating an optical scanner 230 according to a second embodiment of the present invention.

FIG. 10 illustrates in exploded perspective view an optical scanner 230 constructed according to the present embodiment. The optical scanner 230 includes a cover 232 and an oscillating body 234.

The cover 232, which is in common in construction to the cover 126 in the first embodiment, is composed of the plate portion 200 and the vertical wall portion 202, and further the cover 232 is provided with the entrance-side transmissive portion 204 and the exit-side transmissive portion 206 formed in the cover 232.

In addition, the oscillating body 234 includes a horizontal scanning subsystem 236 and a vertical scanning subsystem 238.

Figure 11:
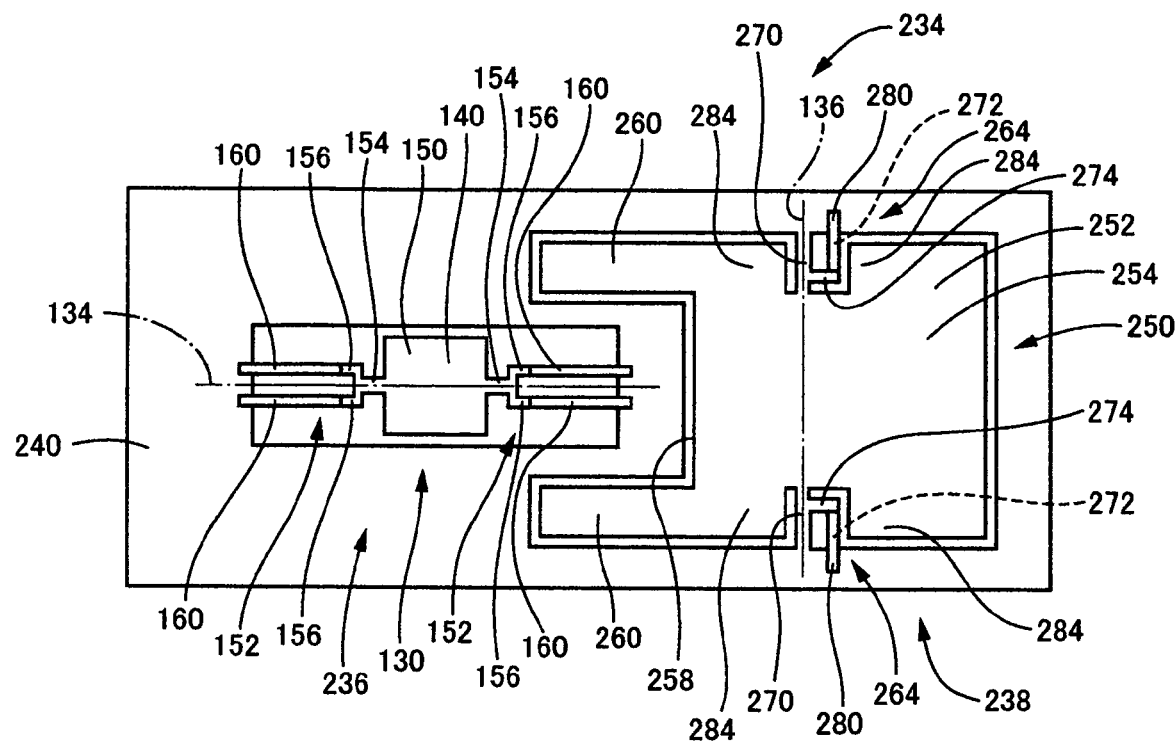
FIG. 11 is a top plan view illustrating an oscillating body 234 in FIG. 10.

The horizontal scanning subsystem 236, which is in common in construction to the horizontal scanning subsystem 120 in the first embodiment, as illustrated in FIG. 11, includes the first oscillating portion 130 which is excited to angularly oscillate about the first oscillation axis 134. The first oscillating portion 130 includes the first mirror portion 150 in which the first reflective surface 140 is formed. The first oscillation axis 134 is positioned to be oriented parallel to a laser beam impinging on the optical scanner 230.

The first mirror portion 150 is coupled with a stationary frame 240, so as to allow an angular oscillation of the first mirror portion 150, via the pair of beam portions 152, 152 each constructed to include the one first leaf spring 154 and the two second leaf springs 156, 156 disposed in parallel to each other. To the four actuators 160, the four second leaf springs 156 of the horizontal scanning subsystem 236 are attached, respectively. The horizontal scanning subsystem 236 scans a laser beam in the horizontal direction at a higher rate, based on the principle identical to that of the horizontal scanning subsystem 120 in the first embodiment.

In the present embodiment, the horizontal scanning subsystem 236 is composed of: the first oscillating portion 130; a portion of the stationary frame 240 which surrounds the first oscillating portion 130; and the four actuators 160.

On the other hand, the vertical scanning subsystem 238, although is common in basic construction to the vertical scanning subsystem 122, differs particularly in the shape of a mirror portion from the vertical scanning subsystem 122.

As illustrated in FIG. 11, the vertical scanning subsystem 238 includes a second oscillating portion 250 excited to angularly oscillate about the second oscillation axis 136 which is oriented perpendicular to the first oscillation axis 134. The second oscillating portion 250 includes a second mirror portion 254 on which a second reflective surface 252 is formed. The second mirror portion 254, differently from the second mirror portion 180 in the first embodiment, has a non-symmetrical shape about the second oscillation axis 136.

More specifically, in the second mirror portion 254, a cutout 258 is formed on one of both sides of the second mirror portion 254 with respect to the second oscillation axis 136, which is proximal to the horizontal scanning subsystem 236. Into the cutout 258, there is partially inserted one of both ends of the horizontal scanning subsystem 236 in the direction of the first oscillation axis 134, which is proximal to the vertical scanning subsystem 238. As a result, the second mirror portion 254 includes overlapping portions 260, which overlap the horizontal scanning subsystem 236 as viewed in a direction of the second oscillation axis 136, and which are disposed at two positions opposing each other with the horizontal scanning subsystem 236 being interposed therebetween, respectively.

On the other hand, designing both the horizontal scanning subsystem 236 and the vertical scanning subsystem 238 to scan laser beams in a resonant mode, and reducing the scanning frequency of the vertical scanning subsystem 238 to be lower than that of the horizontal scanning subsystem 236, require, in general, increasing a moment of inertia of the second mirror portion 254 to be larger than that of the first mirror portion 150. In addition, the larger a dimension of the second mirror portion 254 in its rotation radial direction, i.e., its width dimension, the larger a moment of inertia of the second mirror portion 254.

Further, in the present embodiment, as described above, the second mirror portion 254 is made to overlap the horizontal scanning subsystem 236 in the direction of the second oscillation axis 136, and it is facilitated to array the horizontal and vertical scanning subsystems 236, 238 so as to be closely spaced apart from each other in the array direction. That is, a longitudinal dimension of the optical scanner 230 (dimension in a longitudinal direction parallel to the first oscillation axis 134) is allowed to be smaller than a simple sum of maximum lengths of the horizontal and vertical scanning subsystems 236, 238.

Therefore, the present embodiment would make it easier to make the longitudinal dimension of the optical scanner 230 smaller for the scanning frequency of the vertical scanning subsystem 238 and for the width of the second mirror portion 254. That is, the present embodiment would facilitate the miniaturization of the optical scanner 230 in its longitudinal direction.

As illustrated in FIG. 11, a pair of beam portions 264, 264 extend in opposite directions from opposite lateral edges of the second mirror portion 254 spaced apart in the direction of the second oscillation axis 136. The pair of beam portions 264, 264 connect the second mirror portion 254 with the stationary frame 240 so as to allow the second mirror portion 254 to angularly oscillate about the second oscillation axis 136.

Each beam portion 264 includes: a first leaf spring 270 extending along the second oscillation axis 136; and a second leaf spring 272 extending parallel to the first leaf spring 270 at a position offset from the first leaf spring 270. The first leaf spring 270 couples the second mirror portion 254 and the stationary frame 240 with each other. On the other hand, the second leaf spring 272 couples with the stationary frame 240, the first leaf spring 270 at an extension 274 which radially extends outwardly of the first leaf spring 270 at its halfway point.

In each beam portion 264, an actuator 280 is attached to the second leaf spring 272. The actuator 280 is in common in construction to the actuator 160 in the horizontal scanning subsystem 236. In the present embodiment, the pair of actuators 280, 280 which are attached to the pair of second leaf springs 272, 272, offset from the second oscillation axis 136, respectively, are driven in identical phase. Due to this, the second leaf spring 272 is deflected at its connection with the extension 274, in a direction perpendicular to the surface of the second leaf spring 272. The deflection is converted by the extension 274 into a rotational moment about the second oscillation axis 136, whereby the second mirror portion 254 is excited to angularly oscillate about the second oscillation axis 136.

As described above, in order to reduce the scanning frequency of the vertical scanning subsystem 238 to be lower than that of the horizontal scanning subsystem 236, to increase a moment of inertia of the second mirror portion 254 is desirable. To this end, to increase a dimension of the second mirror portion 254 in the rotation radial direction (transverse dimension) is effective, and to increase a dimension of the second mirror portion 254 in the direction of the second oscillation axis 136 (longitudinal dimension) is also effective.

On the other hand, the larger the longitudinal dimension of the second mirror portion 254, the stronger a tendency that the width (transverse dimension) of the optical scanner 230 increases.

In this regard, in the present embodiment, as illustrated in FIG. 11, the second mirror portion 254 includes overlapping portions 284, 284 overlapping the respective beam portions 264 as viewed in a direction perpendicular to the second oscillation axis 136. That is, the width of the optical scanner 230 is allowed to be smaller than a simple sum of a maximum longitudinal dimension of the second mirror portion 254 and a total of longitudinal dimensions of the pair of beam portions 264.

Therefore, the present embodiment would make it easier to make the transverse dimension of the optical scanner 230 smaller for the longitudinal dimension of the second mirror portion 254, resulting in facilitation in miniaturizing the optical scanner 230 in its lateral direction.

As is evident from the above description, in the present embodiment, the overlapping portions 260 constitute an example of the "portion overlapping the first scanning device" set forth in the above mode (13), the beam portions 264 constitute an example of the "connection" set forth in the above mode (14), and the overlapping portions 284 constitute an example of the "portion overlapping the connection" set forth in the same mode.

Next, there will be described a third embodiment of the present invention will be described. The present embodiment, however, is in common in many elements to the second embodiment, while is different only in elements pertinent to an optical scanner from the second embodiment, and therefore, only the different elements of the present embodiment will be described in greater detail below, while the common elements of the present embodiment will be omitted in detailed description by reference using the identical reference numerals or names to those in the second embodiment.

Figure 12:
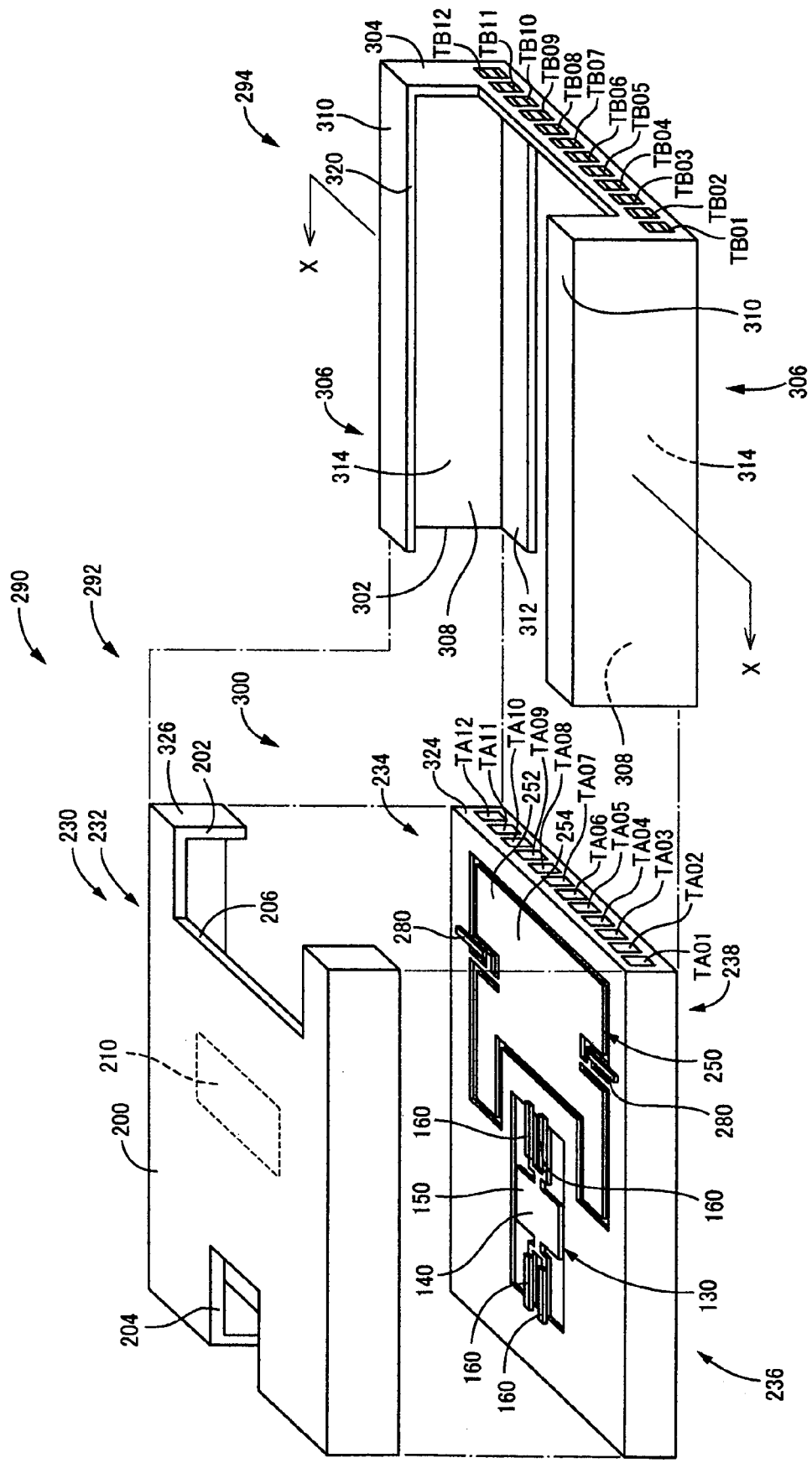
FIG. 12 is an exploded perspective view illustrating an optical scanner 292 in a retinal scanning display device 290 according to a third embodiment of the present invention.

Referring to FIG. 12, there is illustrated in exploded perspective view an optical scanner 292 in a head-mounted retinal scanning display device 290 (hereinafter, abbreviated as "RSD") constructed in accordance with the present embodiment. The RSD 290, except for its components of the optical scanner 292, is in common in construction to the RSD 10 in accordance with the second embodiment.

As illustrated in FIG. 12, the optical scanner 292 in the present embodiment includes the cover 232 and the oscillating body 234, similarly with the second embodiment. The optical scanner 292, differently from the second embodiment, further includes a receiver 294.

The receiver 294, when the cover 232 and the oscillating body 234 are assembled, is detachably attached to an assembly 300 of the cover 232 and the oscillating body 234. As illustrated in FIG. 12, the receiver 294 in the shape of a flattened-box extends in its length direction. The receiver 294 includes: (a) an opening 302 and a bottom portion 304 opposing each other in the length direction of the receiver 294; and (b) a pair of lateral portions 306, 306 coextending between the opening 302 and the bottom portion 304 in the length direction of the receiver 294.

As illustrated in FIG. 12, the pair of lateral portions 306, 306 are opposed to each other with a space therebetween, in a width direction of the receiver 294. The lateral portions 306, 306 have at their opposing faces insert grooves 308, 308, respectively, which coextend along the respective lateral portions 306, 306. Each insert groove 308, 308 is formed by means of an upper plate portion 310, 310 and a lower plate portion 312, 312 opposing each other in a thickness direction of the receiver 294, both of which belong to a corresponding one of the lateral portions 306, 306; and an end plate portion 314, 314 extending in the length direction of the receiver 294. The end plate portions 314, 314 extend in the length direction of the receiver 294 so as to interconnect the upper plate portions 310, 310 and the lower plate portions 312, 312 at their distal edges from a center of the receiver 294 in its width direction. That is, the pair of insert grooves 308, 308 are formed at the pair of lateral portions 306, 306 of the receiver 294, in opposition to each other in the width direction of the receiver 294.

As illustrated in FIG. 12, the receiver 294 includes an opening 320 formed at an upper face of the receiver 294. With the assembly 300 of the cover 232 and the oscillating body 234 being inserted into the receiver 294, the entrance-side transmissive portion 204 and the exit-side transmissive portion 206 are exposed at the opening 320 of the receiver 294.

The assembly 300 of the cover 232 and the oscillating body 234 to the receiver 294, when needed to be attached to the receiver 294, is inserted into the receiver 294 through its opening 302. The assembly 300 is brought into engagement with the pair of insert grooves 308, 308 of the receiver 294, and, while being guided by the pair of insert grooves 308, 308, is moved toward a bottom portion 304 of the receiver 294. The assembly 300 is inserted into the receiver 294 to a depth allowing leading ends 324, 326 of the assembly 300 in the insertion direction, to abut on the bottom portion 304 of the receiver 294.

As illustrated in FIG. 12, the oscillating body 234 in the shape of a flattened box extends in its length direction, and a plurality of second power terminals TA01–TA12 are provided to the leading end 324 of both ends of the oscillating body 234 in the insertion direction of the assembly 300. The second power terminals TA01–TA12 are provided as many as a totality of the electrodes 162, 164 of the actuators 160 for actuating the first mirror portion 150 and the electrodes 162, 164 of the actuators 280 for actuating the second mirror portion 254, with which the oscillating body 234 is provided. In association with the second power terminals TA01–TA12, first power terminals TB01–TB12 are disposed at the bottom portion 304 of the receiver 294, as many as the second power terminals TA01–TA12.

It is adapted that, when the oscillating body 234 is brought into abutment at its leading end 324 on the bottom portion 304 of the receiver 294 as a result of insertion thereinto, the plurality of second power terminals TA01–TA12 of the oscillating body 234 and the plurality of first power terminals TB01–TB12 of the receiver 294 are brought into electrical contact with each other in one-to-one correspondence. This enables electric power output from an external power source not illustrated, to be supplied to the individual electrodes 162, 164 of the oscillating body 234, by passing through the first power terminals TB01–TB12 and the second power terminals TA01–TA12, in the description order.

The optical scanner 292 is provided with a positioning configuration for positioning the assembly 300, with the assembly 300 of the cover 232 and the oscillating body 234 being attached to the receiver 294 as a result of insertion thereinto. The positioning configuration includes: a first positioner for positioning the assembly 300 with respect to the width direction of the receiver 294; a second positioner for positioning the assembly 300 with respect to the thickness direction of the receiver 294; a third positioner for positioning the assembly 300 with respect to the length direction of the receiver 294.

Figure 13:
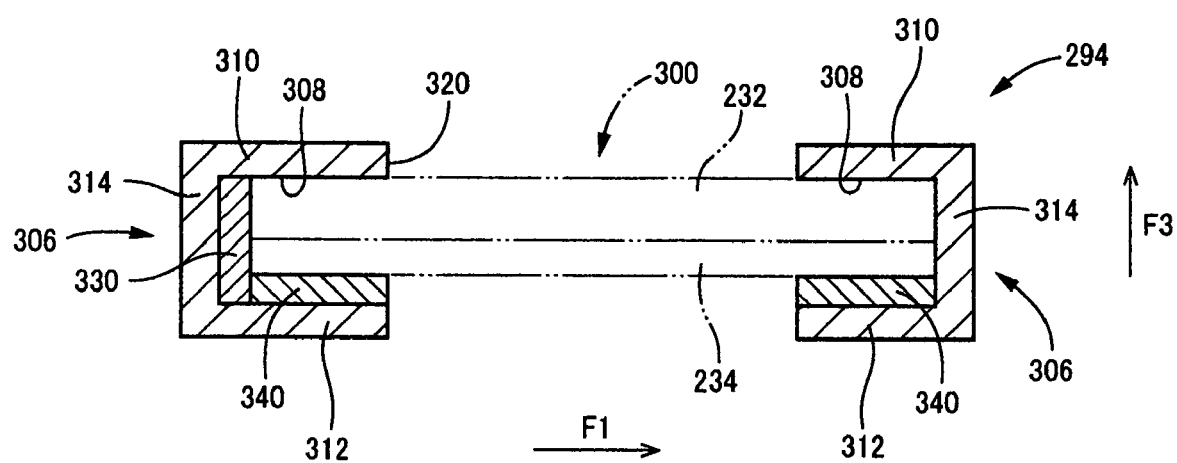
FIG. 13 is a cross section taken along line X—X in FIG. 12.

FIG. 13 is a cross section taken on line X—X in FIG. 12. The above-mentioned first positioner includes a first pressing member 330 disposed between the assembly 300 and the receiver 294, at one of the pair of insert grooves 308, 308, which oppose each other in the width direction of the receiver 294, along a direction in which the one insert groove 308 extends, which is to say, the length direction of the receiver 294. The first pressing member 330, made up of an elastic material, elastically presses the assembly 300 onto the receiver 294 in a direction in which one of the pair of insert grooves 308, 308 faces the other, which is to say, the width direction of the receiver 294 (the direction indicated by the arrow labeled as "F1" in FIG. 13). The pressing allows the assembly 300 to be positioned with respect to the width direction of the receiver 294.

Figure 21:
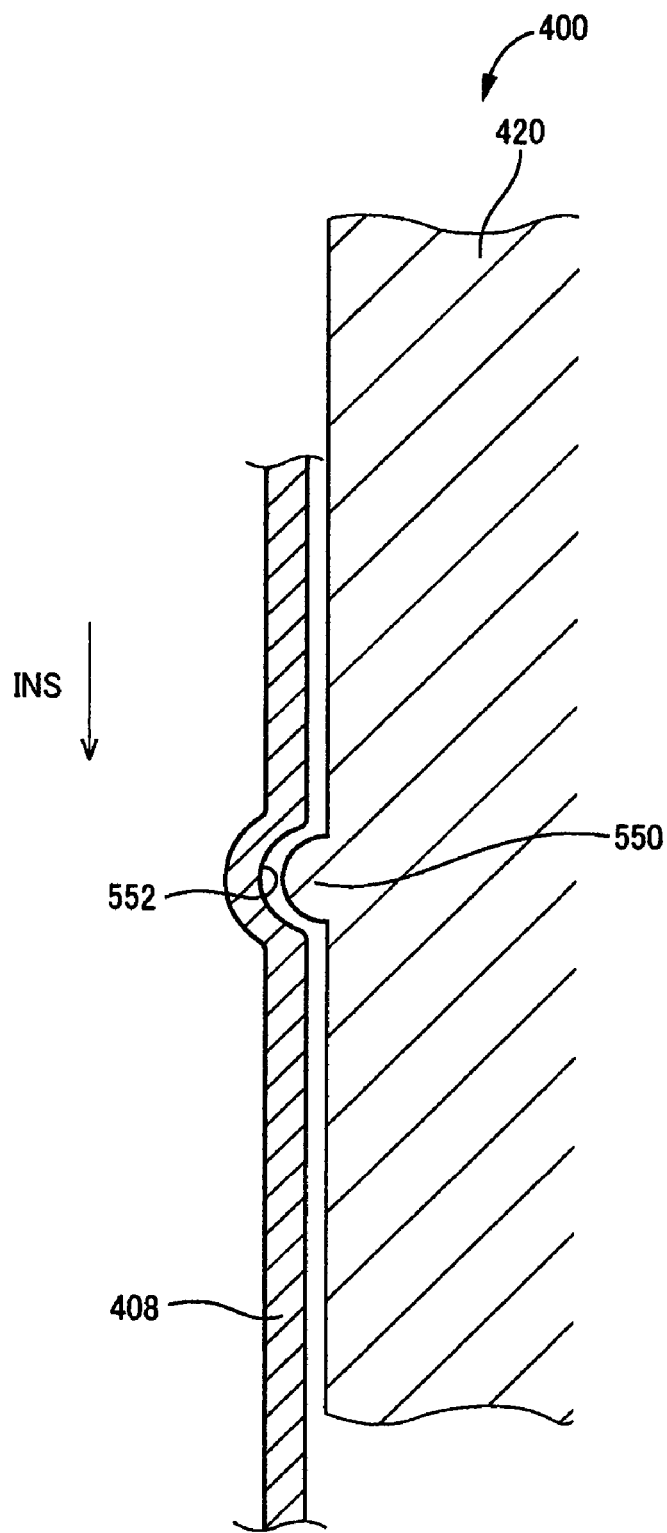
FIG. 21 is a sectional view illustrating a projection 550 and a depression 552 formed on the mirror unit 400 and the mirror-unit receiver 408 depicted in FIG. 19, respectively.

In addition, the third positioner positions the assembly 300 with respect to the length direction of the receiver 294, by pressing elastically the assembly 300 onto the receiver 294 in the insertion direction of the assembly 300, which is to say, the length direction of the receiver 294. The third positioner includes a protrusion-to-recess fit-into portion (not illustrated), which has a structure common to that in which a protrusion 550 and a recess 552 illustrated in FIG. 21 are fitted into each other. The protrusion-to-recess fit-into portion, which will be described by reference to FIG. 21 for convenience purposes, includes the protrusion 550 disposed at one of the assembly 300 and the receiver 294, and the recess 552 disposed at the other. In this protrusion-to-recess fit-into portion, the protrusion 550 is elastically fitted into the recess 552.

The protrusion 550 and the recess 552 each have an inclined surface (including a surface inclined at 90°) inclined relative to the length direction of the receiver 294. As a result of their inclined surfaces being elastically pressed against each other in the length direction of the receiver 294, with the protrusion 550 and the recess 552 being fitted into each other, there is produced a force to press the assembly 300 onto the receiver 294 in its length direction.

As illustrated in FIG. 13, the aforementioned second positioner includes second pressing members 340, 340 disposed between the assembly 300 and the receiver 294, at the pair of insert grooves 308, 308, which oppose each other in the width direction of the receiver 294, along a direction in which the pair of insert grooves 308, 308 extend, which is to say, the length direction of the receiver 294. The second pressing members 340, 340, made up of an elastic material, elastically press the assembly 300 onto the receiver 294 in a direction in which the lower plate portions 312, 312, which are ones of the upper plate portions 310, 310 and the lower plate portions 312, 312 opposing each other in the thickness direction of the receiver 294 for each lateral portions 306, 306, faces the upper plate portions 310, 310, which are the other ones, which is to say, the thickness direction of the receiver 294 (the direction indicated by the arrow labeled as "F3" in FIG. 13). The pressing allows the assembly 300 to be positioned with respect to the thickness direction of the receiver 294.

Figure 14:
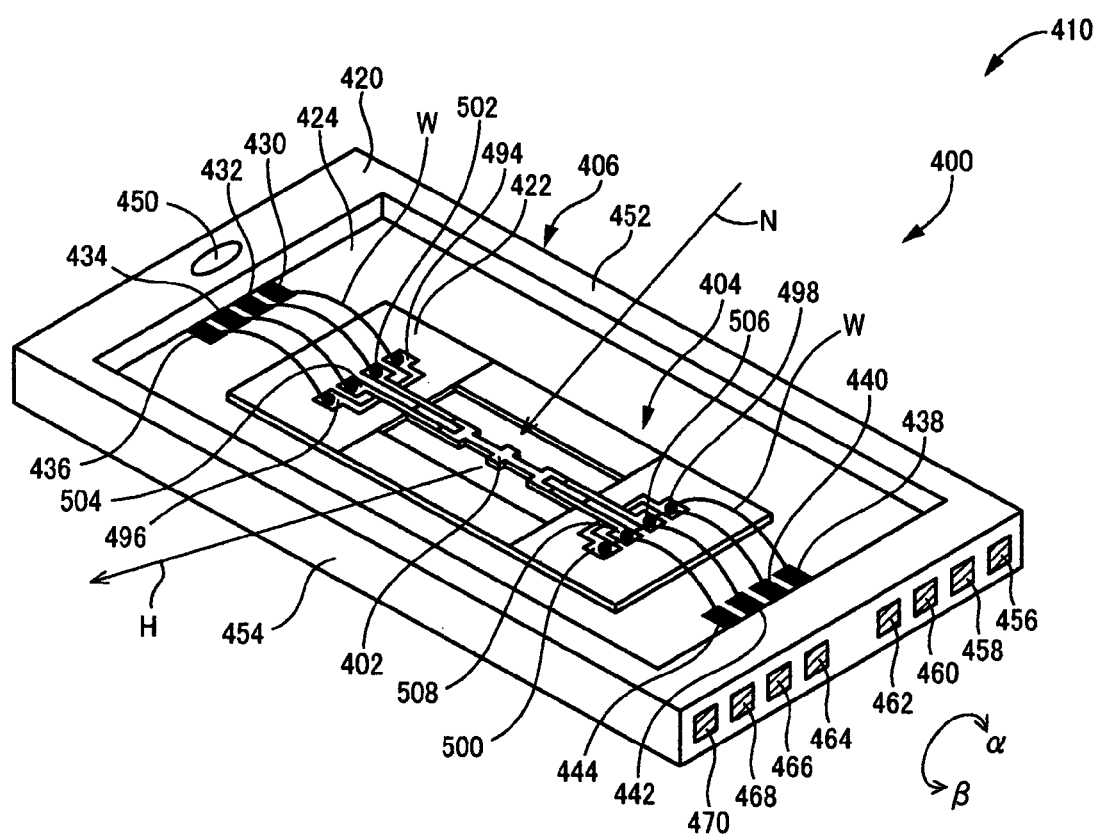
FIG. 14 is a perspective view illustrating a mirror unit 400 in an optical scanning device 410 according to a fourth embodiment of the present invention.

Next, there will be described a fourth embodiment of the present invention. FIGS. 14–22 illustrate a mirror unit 400 constructed in accordance with the present embodiment. As illustrated in FIG. 14, in the mirror unit 400, a scanning mirror 402 and an actuator 404 are disposed in a mirror support 406, the actuator 400 being adapted to actuate the scanning mirror 402 for its angular oscillation in directions indicated by the arrows labeled as "α" and "β" in this Figure.

Figure 15:
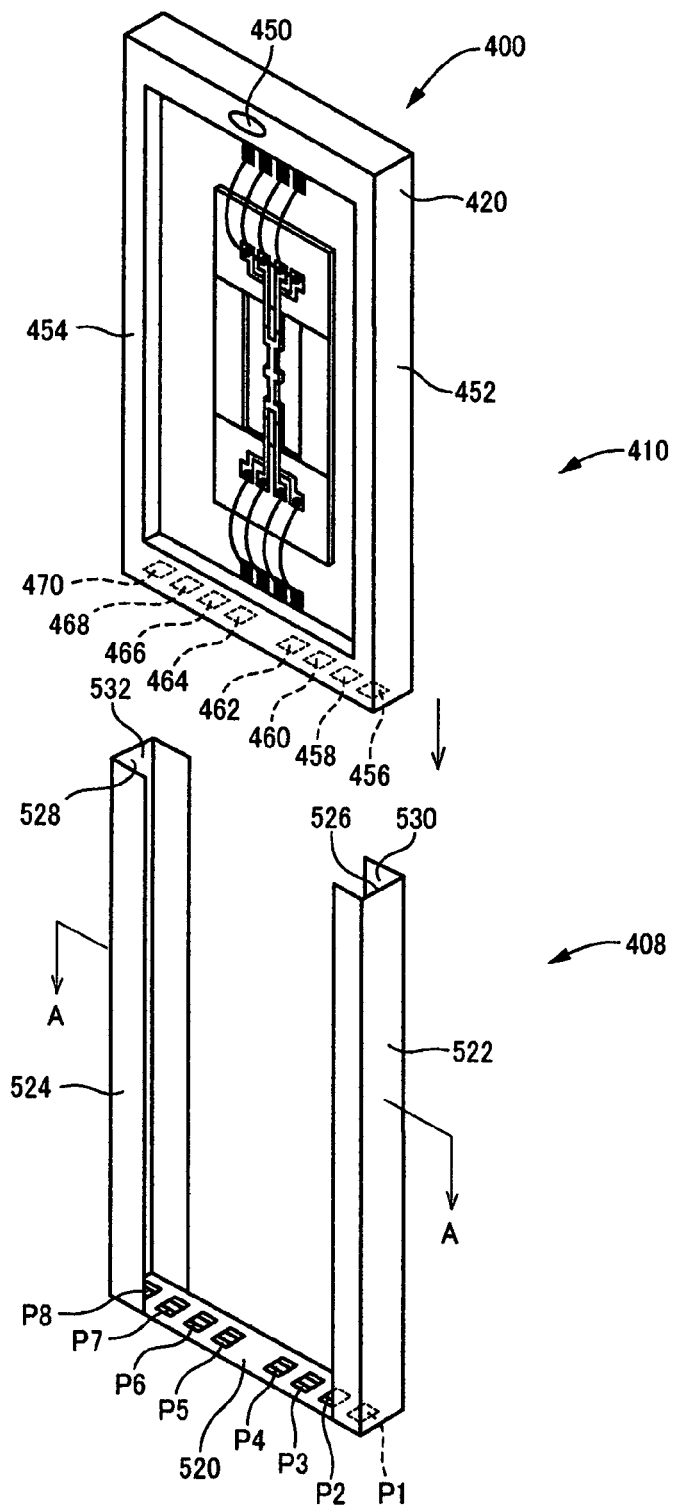
FIG. 15 is an exploded perspective view illustrating a mirror unit 400 and a mirror-unit receiver 408 constituting the optical scanning device 410 depicted in FIG. 14.

The mirror unit 400 is optics angularly oscillating the scanning mirror 402 in a manner described above, to thereby reflect incoming light N impinging on the scanning mirror 402, into a direction depending on the angular position of the scanning mirror 402, as scanning light H. As illustrated in FIG. 15, the mirror unit 400 is configured so as to be detachably attached to a mirror-unit receiver 408.

Figure 16:
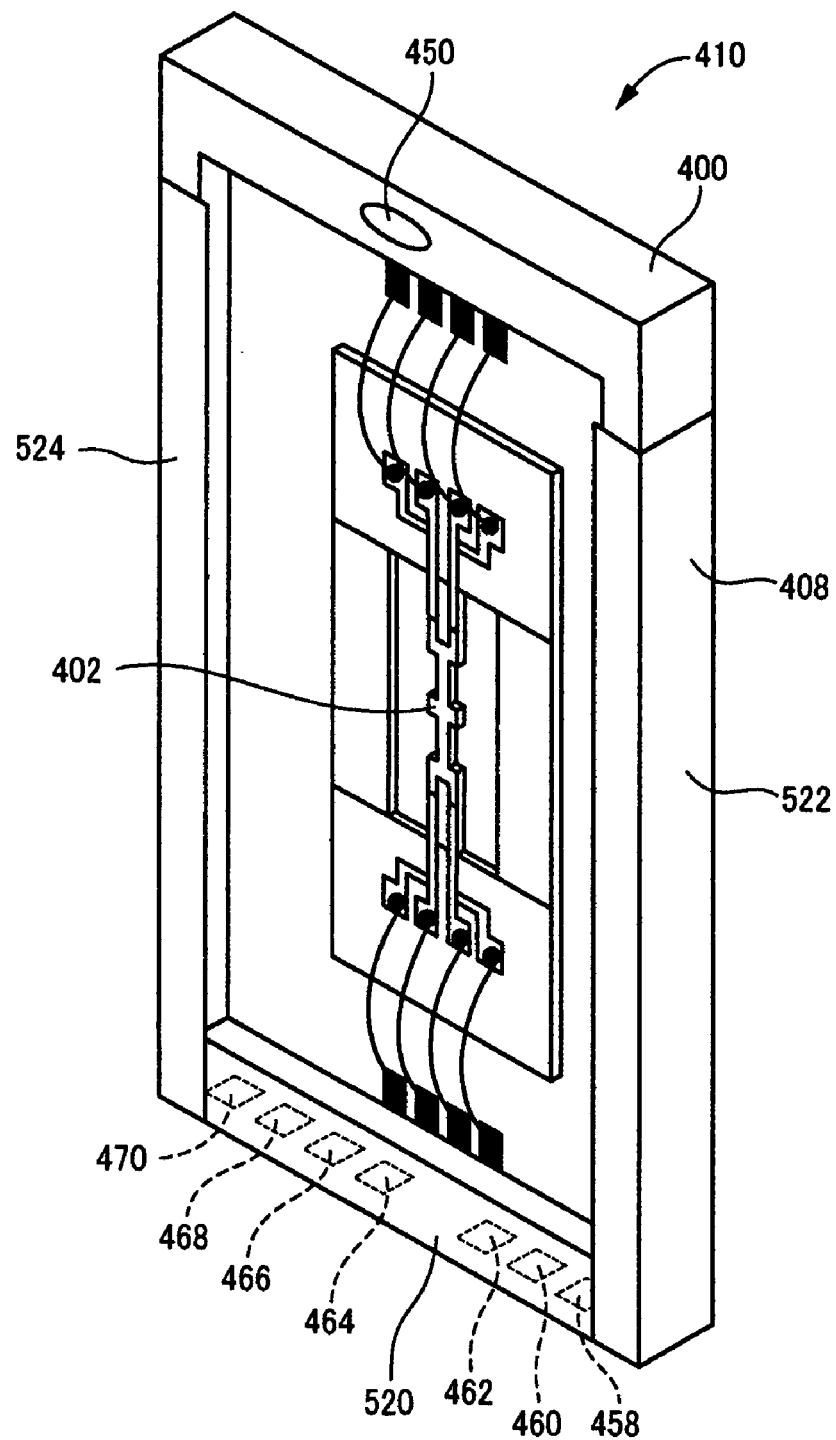
FIG. 16 is a perspective view illustrating the mirror unit 400 and a mirror-unit receiver 408 constituting the optical scanning device 410 depicted in FIG. 14, as assembled.

FIG. 16 illustrates the mirror unit 400 when attached with the mirror-unit receiver 408 (when in use). In the present embodiment, an optical scanning device 410 is constructed by attaching the mirror unit 400 to the mirror-unit receiver 408. This optical scanning device 410 controls an angular oscillation of the scanning mirror 402, to thereby scan the scanning light H emerging from the scanning mirror 402 on a screen which is an example of an image-formed plane. As a result, an image is displayed on the screen.

Returning next to FIG. 14, there will be described a specific construction of the mirror support 406 of the mirror unit 400.

The mirror support 406 includes a casing 420 and a base plate 422 attached to the casing 420. On the base plate 422, the aforementioned scanning mirror 402 and the actuator 404 are disposed. The casing 420 is formed, for example, such that the casing 420 is generally in the form of a rectangular solid, and has a base-plate-attached portion 424 in a recess formed at one of faces of the casing 420.

The base plate 422 is disposed in the base-plate-attached portion 424. The base-plate-attached portion 424 includes at its bottom plane, a plurality of relay terminals 430–444. Covering an upper opening of the base-plate-attached portion 424 with a transparent cover which is transmissive to light, as not illustrated, enables an inner space of the base-plate-attached portion 424 to be sealed for preventing introduction thereinto of foreign matter such as dirt and dust from the outside.

As illustrated in FIG. 15, although the mirror unit 400 is detachably attached to the mirror-unit receiver 408, there exists as one of modes in which the mirror unit 400 is detachably attached to the mirror-unit receiver 408, a mode in which the mirror unit 400 is attached to the mirror-unit receiver 408 so as to be insertable into and extractable from the mirror-unit receiver 408. The mirror unit 400 will be described below by way of an example of this mode.

In this mode, a catch 450 is disposed in the casing 420 of the mirror unit 400 at its rearmost one of both ends in the insertion direction (which is also referred to as a trailing end, and is an upper end in FIG. 15), on an upper one of both faces of the rearmost end in the thickness direction, the upper face being located on the same side as the scanning mirror 402. The catch 450 is provided for facilitating a worker to catch the mirror unit 400 in an attempt to insert or extract the mirror unit 400, to thereby achieve an enhanced workability.

As illustrated in FIG. 15, the pair of lateral portions 306, 306 of the casing 420 which are spaced apart in its width direction are mounting portions 452, 454 which are insertable into the mirror-unit receiver 408. In addition, a plurality of power-supplied terminals 456–470 are disposed in a leading one of both ends of the casing 420 in the insertion direction, on its leading end face opposing the mirror-unit receiver 408. These power-supplied terminals 456–470 are in electrical contact with the plurality of relay terminals 430–444 (see FIG. 14) via wirings, etc., as not illustrated.

Next, there will be described the scanning mirror 402 and the actuator 404 by reference to FIGS. 17 and 18.

Figure 17:
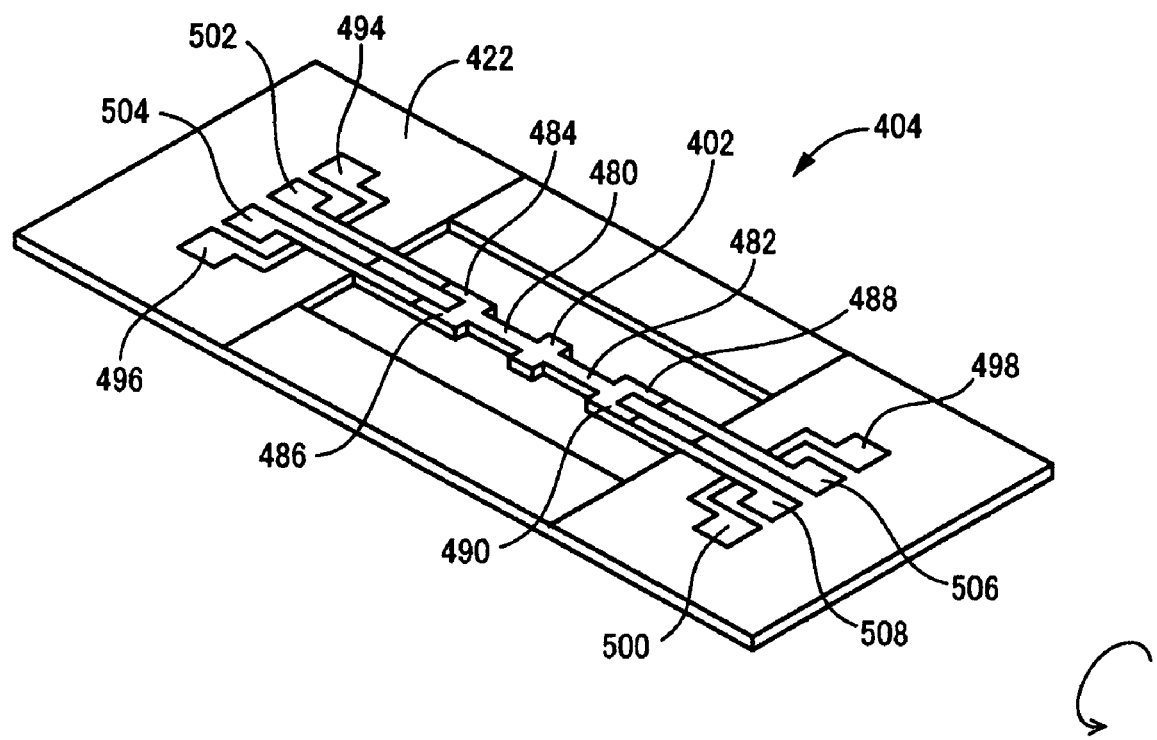
FIG. 17 is a perspective view illustrating how a scanning mirror 402, an actuator 404, and a plurality of terminals 494–508 on a base plate 422 in the mirror unit 400 in FIG. 16.

FIG. 17 illustrates in perspective view the exterior of the scanning mirror 402 disposed on the base plate 422 and the exterior of the actuator 404 actuating the scanning mirror 402. As illustrated in FIG. 17, the scanning mirror 402 is plate-shaped, and a reflective surface is formed on an upper surface of the scanning mirror 402 illustrated in this Figure.

A pair of rotation-axis portions 480, 482 coextend in opposite directions from the scanning mirror 402 through its rotation centerline. Each rotation-axis portion 480, 482 is bifurcated halfway when going away from the scanning mirror 402. As a result, there are coupled with one of the rotation-axis portions 480, two connections 484, 486 coextending in parallel, with the aforementioned rotation centerline being interposed therebetween, and there are coupled with the other of the rotation-axis portions 482, two connections 488, 490 coextending in parallel, with the aforementioned rotation centerline being interposed therebetween.

Figure 18:
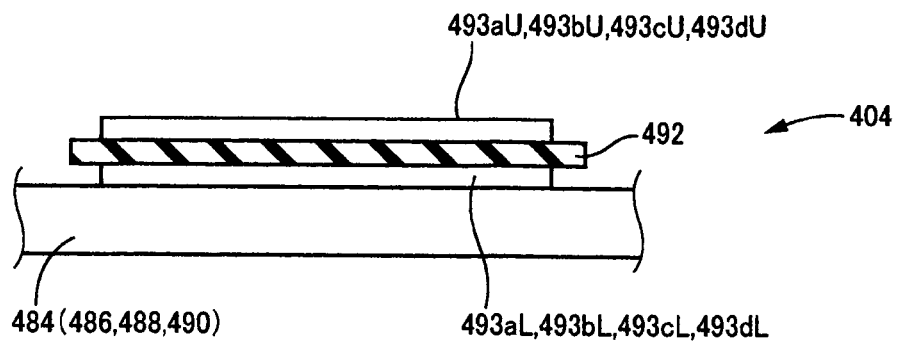
FIG. 18 is a longitudinal sectional view for explaining the principle due to which a piezoelectric element 492 repeatedly elastically flexes a connection 484 in FIG. 17.
Figure 18:
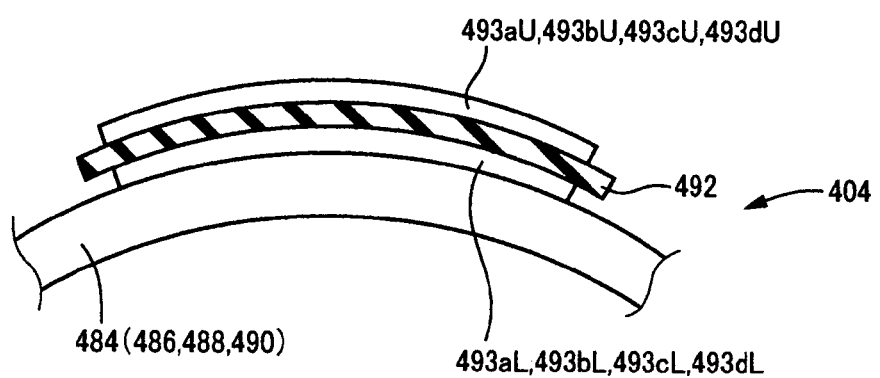
Figure 18:
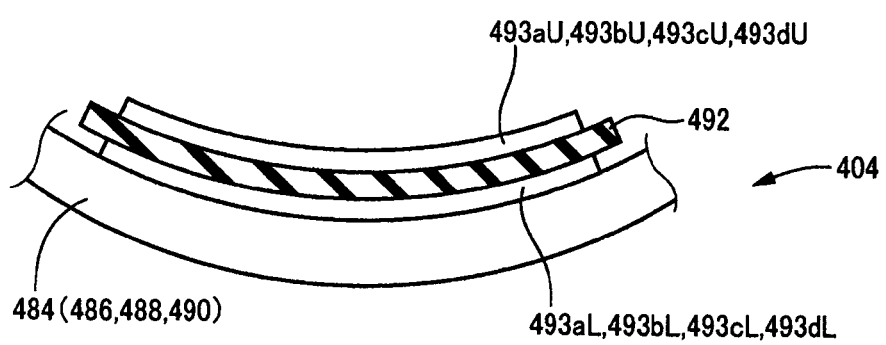

On each connection 484, 486, 488, 490, as illustrated in FIG. 18 illustrating the connection 484 as a representative connection, at its upper face in this Figure, there is disposed a piezoelectric element 492 which is an example of an element for converting electric field or voltage into displacement or distortion.

As illustrated in FIG. 18, each actuator 404 attached to each connection 484, 486, 488, 490, includes: the piezoelectric element 492; and a lower electrode 493L (lower electrodes 493aL, 493bL, 493cL, 493dL corresponding to the connections 484, 486, 488, 490, respectively) and an upper electrode 493U (upper electrodes 493aU, 493bU, 493cU, 493dU corresponding to the connections 484, 486, 488, 490, respectively) which are laid on the piezoelectric element 492 at its both faces, respectively, with the piezoelectric element 492 being sandwiched between the electrodes 493L and 493U. In the present embodiment, the piezoelectric element 492, which is of a unimorph type, is attached to a single side of the connection 484 which is an elastic material, via the lower electrode 493aL.

Now, an operation of each actuator 404 will be described by way of an example of the piezoelectric element 492 sandwiched between the lower electrode 493aL and the upper electrode 493aU each corresponding to the connection 484. As a voltage impressed across the lower electrode 493aL and the upper electrode 493aU varies in direction, the piezoelectric element 492 and the connection 484 repeat alternately a shifting from a neutral state depicted in FIG. 18(a) to an upwardly curved state depicted in FIG. 18(b), and a shifting from the neutral state depicted in FIG. 18(a) to an downwardly curved state depicted in FIG. 18(c). As a result, a direction in which the connection 484 is deflected varies repeatedly between in upward and downward directions.

Accordingly, the rotation-axis portions 480, 482 rotate in a direction of the arrow indicated in FIG. 17 and the scanning mirror 402 also angularly rotates in the same direction, once the piezoelectric element 492 sandwiched between the lower electrode 493aL and the upper electrode 493aU in the connection 484 illustrated in FIG. 17, and the piezoelectric element 492 sandwiched between the lower electrode 493cL and the upper electrode 493cU in the connection 488, are deflected to upwardly convex as illustrated in FIG. 18(b), and the piezoelectric element 492 sandwiched between the lower electrode 493bL and the upper electrode 493bU in the connection 486, and the piezoelectric element 492 sandwiched between the lower electrode 493dL and the upper electrode 493dU in the connection 490, are deflected to downwardly convex as illustrated in FIG. 18(c).

Therefore, controlling voltages applied between the lower electrodes 493aL, 493bL, 493cL, 493dL, and the upper electrodes 493aU, 493bU, 493cU, 493dL, for controlling the angular oscillation of the scanning mirror 402, would allow the reflection for deflection of the incoming light N into the scanning light H, resulting in achievement of the capability of scanning light.

As illustrated in FIG. 17, the lower and upper electrodes 493aL, 493aU corresponding to the connection 484 are electrically connected with a lower-electrode terminal 494 and an upper-electrode terminal 502, respectively. Similarly, the lower and upper electrodes 493bL, 493bU corresponding to the connection 486 are electrically connected with a lower-electrode terminal 496 and an upper-electrode terminal 504, respectively. Still similarly, the lower and upper electrodes 493cL, 493cU corresponding to the connection 488 are electrically connected with a lower-electrode terminal 498 and an upper-electrode terminal 506, respectively. Yet still similarly, the lower and upper electrodes 493dL, 493dU corresponding to the connection 490 are electrically connected with a lower-electrode terminal 500 and an upper-electrode terminal 508, respectively.

As illustrated in FIG. 14, the lower-electrode terminal 494, the upper-electrode terminal 502, the upper electrode terminal 504, and the lower-electrode terminal 498 are electrically connected with the plurality of relay terminals 430, 432, 434, 436 disposed on the casing 420, respectively, via bonding wires W. Similarly, the lower-electrode terminal 498, the upper-electrode terminal 506, the upper electrode terminal 508, and the lower-electrode terminal 500 are electrically connected with the plurality of relay terminals 438, 440, 442, 444 disposed on the casing 420, respectively, via bonding wires W.

As illustrated in FIG. 15, the mirror-unit receiver 408, which detachably supports the mirror unit 400, may be made to have a configuration allowing the mirror-unit receiver 408 to receive the mirror unit 400 in an insertable and extractable manner, as descried above.

By reference to FIGS. 15 and 16, there will be described a more specific construction of the mirror-unit receiver 408 receiving the mirror unit 400 in an insertable and extractable manner.

As illustrated in FIG. 15, the mirror-unit receiver 408 includes: a leading-end receiving section 520 receiving the leading end of the mirror unit 400; and a pair of lateral-portion receiving sections 522, 524 disposed upright on the leading-end receiving section 520 and receiving the pair of mounting portions 452, 454 composing the mirror unit 400.

There are formed in the pair of lateral-portion receiving sections 522, 524, a pair of insert grooves 526, 528 into and from which there are insertable and extractable, the pair of mounting portions 452, 454 which are included in the casing 420 of the mirror unit 400. The pair of insert grooves 526, 528 are closed at their leading end sides in the insertion direction with the leading-end receiving section 520, and are opened at their trailing end sides to function as insertion openings 530, 532 allowing the pair of mounting portions 452, 454 to be inserted.

As illustrated in FIG. 16, the pair of lateral-portion receiving sections 522, 524 of the mirror-unit receiver 408 are designed to have a dimension in the insertion direction, i.e., length smaller than that of the mirror unit 400, so as to allow the catch 450 of the mirror unit 400 to be exposed from the mirror-unit receiver 408, with the mirror unit 400 being received by the mirror-unit receiver 408.

As illustrated in FIG. 15, at the leading-end receiving section 520 of the mirror-unit receiver 408, a plurality of power-supplying terminals P1–P8 are disposed. The power-supplying terminals P1–P8 are in electrical contact with the plurality of power-supplied terminals 456–470 of the mirror unit 400, respectively, with the mirror unit 400 being inserted into the mirror-unit receiver 408, as illustrated in FIG. 16.

Electric power supplied from an external power source not illustrated is delivered to the lower electrodes 493$a$L, 493$b$L, 493$c$L, and 493$d$L, and the upper electrodes 493$a$U, 493$b$U, 493$c$U, and 493$d$L, via the plurality of power-supplying terminals P1–P8, the plurality of power-supplied terminals 456–470, the plurality of relay terminals 430–444, the lower-electrode terminals 494–500, and the upper-electrode terminals 502–508, in the description order.

As illustrated in FIG. 16, the present embodiment includes a positioning configuration for positioning the mirror unit 400, with the mirror unit 400 being mounted on the mirror-unit receiver 408.

Figure 19:
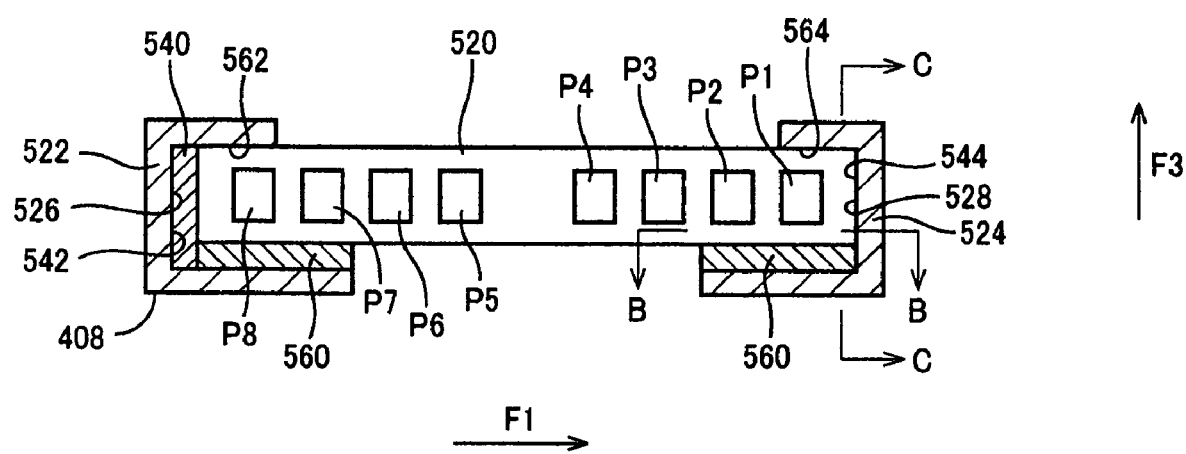
FIG. 19 is a sectional view taken along line A—A in FIG. 15.

Referring now to FIGS. 19–22, the positioning configuration will be described. The positioning configuration includes a first positioner, a second positioner, and a third positioner. Referring first to FIG. 19, the first positioner will be described.

FIG. 19 is a cross section taken on line A—A in FIG. 15. The aforementioned first positioner includes a first pressing member 540 disposed between the insert groove 526 and the mirror unit 400, the insert groove 526 being one of the insert grooves 526, 528 in the mirror-unit receiver 408. The first pressing member 540 is made up of an elastic material. The first pressing member 540 is disposed to extend along an entire length of a groove bottom 540 of the insert groove 526.

The first pressing member 540 elastically presses the mirror unit 400 onto the other insert groove 528, with the mirror unit 400 being inserted into the insert grooves 526, 528. The elasticity of the first pressing member 540 causes the mirror unit 400 to be pressed at one (hereinafter, referred to as "opposite lateral-face") of lateral faces of the casing 420 which is opposite to the other lateral-face with which the first pressing member 540 is engaged, onto an groove bottom 544 of the other insert groove 528. The pressing allows the mirror unit 400 to be positioned with respect to the width direction of the mirror unit 400, which is to say, a direction which is perpendicular with respect to the insertion direction of the mirror unit 400, and which is in parallel to the reflective surface of the scanning mirror 402 (the direction indicated by the arrow labeled as "F1" in FIG. 19).

The opposite lateral-face of the casing 420 of the mirror unit 400 and the groove bottom 544 of the insert groove 528 onto which the opposite lateral-face is pressed are each in the shape of a flat surface so as to allow a surface-to-surface contact therebetween. This allows the mirror unit 400 to be positioned with a further improved precision.

Figure 20:
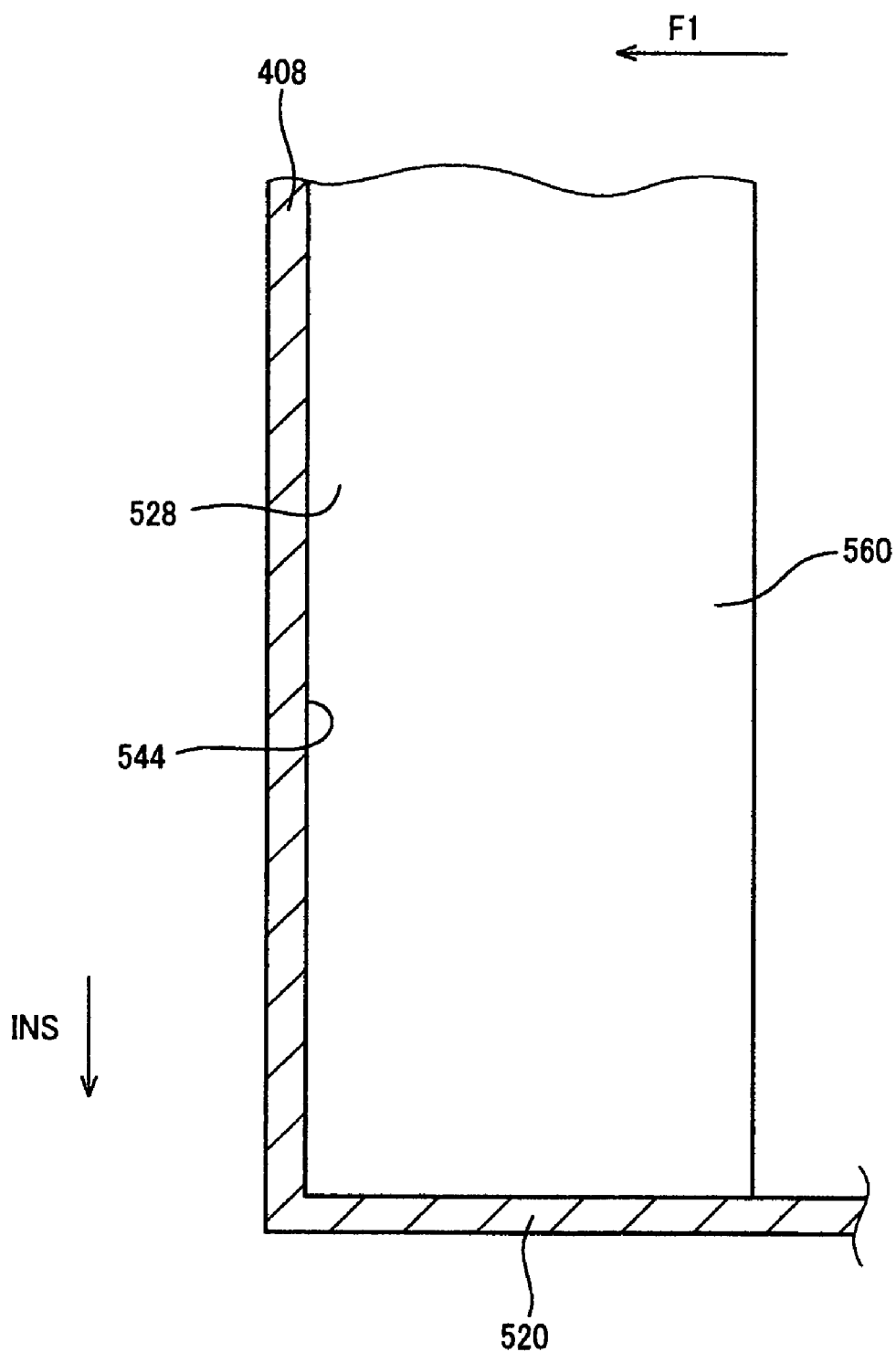
FIG. 20 is a sectional view taken along line B—B in FIG. 19.

As illustrated in FIG. 20 which is a sectional view taken on line B—B in FIG. 19, the groove bottom 544 of the insert groove 528 and the leading-end receiving section 520 are formed to form a predetermined angle (e.g., 90 degrees). This allows the mirror unit 400 to be positioned with a still further improved precision. The direction of the arrow labeled as "INS" in FIG. 20 indicates the insertion direction of the mirror unit 400.

That is to say, the aforementioned first positioner is constructed with the first pressing member 540 depicted in FIG. 19, the flat-shaped opposite lateral-face of the casing 420 of the mirror unit 400, and the flat-shaped groove bottom 544 of the insert groove 528.

Referring next to FIG. 21, the aforementioned second positioner will be described. This second positioner is for positioning the mirror unit 400 by press in the insert direction. The direction of the arrow labeled as "INS" in FIG. 21 indicates the insertion direction of the mirror unit 400.

In order for this second positioner to be constructed, as illustrated in FIG. 21, the protrusion 550 is formed in the mirror unit 400, while the recess 552 into which the protrusion 550 can be fitted is formed in the mirror-unit receiver 408. A portion of the mirror-unit receiver 408 at which the recess 552 is formed is smaller in flexural rigidity than a portion of the mirror unit 400 at which the protrusion 550 is formed, prone to be localized elastic deformation.

The protrusion 550 and the recess 552 each have an inclined surface (including a surface inclined at 90°) inclined relative to the length direction of the mirror-unit receiver 408. As a result of their inclined surfaces being elastically pressed against each other in the length direction of the mirror-unit receiver 408, with the protrusion 550 and the recess 552 being fitted into each other, there is produced a force to press the mirror unit 400 onto the mirror-unit receiver 408 in its length direction. The protrusion 550 is elastically fitted into the recess 552 functioning as a second pressing member.

The protrusion 550 and the recess 552 are configured to have a relative positional relation to achieve that, at a point after the mirror unit 400 is inserted into the insert grooves 526, 528, and just before the leading end face of the mirror unit 400 is brought into abutment with the leading-end receiving section 520 of the mirror-unit receiver 408, as illustrated in FIG. 16, the protrusion 550 starts being fitted into the recess 550, as illustrated in FIG. 21, and that, in the abutment state, the protrusion 550 is pressed onto the recess 552 under pressure.

In the present embodiment using the thus-configured second positioner, once the protrusion 550, as a result of inserting the mirror unit 400 into the insert grooves 526, 528 of the mirror-unit receiver 408, has been fitted into the recess 552, an elastic force generated between the protrusion 550 and the recess 552 is transmitted to the mirror unit 400. Due to the transmitted elastic force, the mirror unit 400 is pressed in the insertion direction. As a result, the mirror unit 400 is fixed in position with respect to the insertion direction of the mirror unit 400, with the leading end face of the mirror unit 400 being in surface contact with the leading-end receiving section 520 of the mirror-unit receiver 408.

Although the construction of the second positioner of a protrusion-to-recess fit-into type allowing the mirror unit 400 to be positioned with respect to the insertion direction, by the use of elastic press, by way of an example of the construction in which the protrusion 550 is disposed in the mirror unit 400, while the recess 552 is disposed in the mirror-unit receiver 408, the present invention may be practiced by employing the construction in which the protrusion 550 is disposed in the mirror-unit receiver 408, while the recess 552 is disposed in the mirror unit 400.

Referring next to FIG. 19, the aforementioned third positioner will be described.

As illustrated in FIG. 19, this third positioner includes third pressing members 560 provided within the insert grooves 526, 528. The third pressing members 560 are disposed between the mirror unit 400 and the mirror-unit receiver 408. This third pressing members 560, located behind the mirror unit 400 with respect to the reflection direction of the scanning mirror 402 of the mirror unit 400, elastically press the mirror unit 400 onto the mirror-unit receiver 408, in a direction in which the reflective surface of the scanning mirror 402 is facing (the direction indicated by the arrow labeled as "F3" in FIG. 19).

Due to the pressing, the mirror unit 400 is pressed at an upper face of the casing 420, onto groove walls 562, 564 of the insert grooves 526, 528, and is positioned with respect to a direction perpendicular with respect to the insertion direction of the mirror unit 400, and perpendicular with respect to the reflective surface of the scanning mirror 402. Forming frontal faces of the mounting portions 452, 454 of the casing 420 of the mirror unit 400 and the groove walls 562, 564 of the inserts grooves 526, 528 so as to allow surface contact with each other, would allow the mirror unit 400 to be positioned with a still improved precision.

Figure 22:
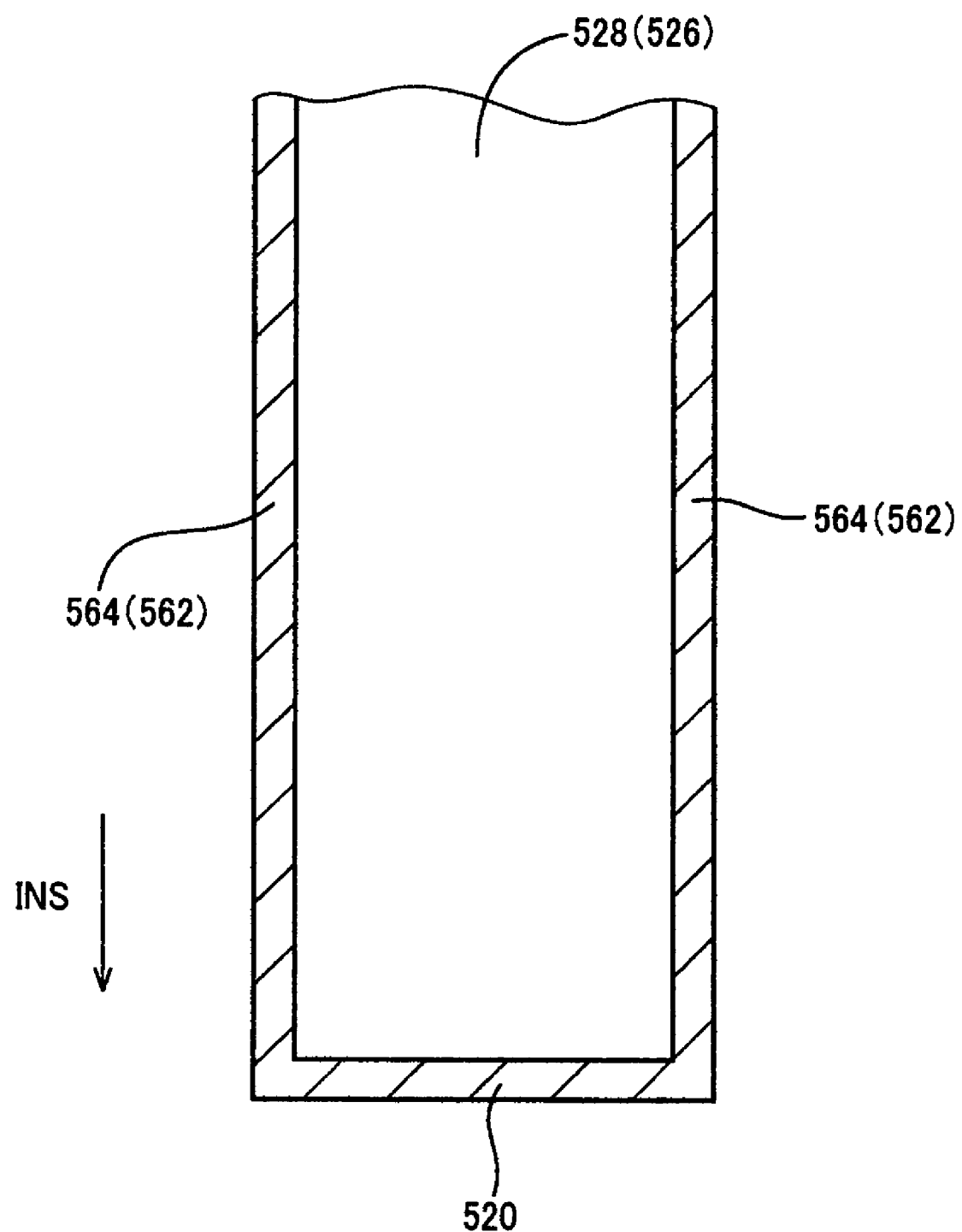
FIG. 22 is a sectional view taken along line C—C in FIG. 15.

As illustrated in FIG. 22 which is a sectional view taken on line C—C in FIG. 19, when the mirror-unit receiver 408 is formed such that, per each insert groove 526, 528, pairs of groove walls 562, 562, 564, 564 and the leading-end receiving section 520 form a predetermined angle (e.g., 90 degrees), the mirror unit 400 is positioned with a still further improved precision. The direction of the arrow labeled as "INS" in FIG. 20 indicates the insertion direction of the mirror unit 400.

That is to say, the aforementioned third positioner is constructed with the third pressing member 560 depicted in FIG. 19, the frontal faces of the mounting portions 452, 454 of the casing 420, and the groove walls 562, 564 of the insert grooves 526, 528.

Next, there will be described the procedure for assembling the mirror unit 400 and the mirror-unit receiver 408 constructed in the above manner.

As illustrated in FIG. 15, first, a worker moves the mirror unit 400 toward the mirror-unit receiver 408, and inserts the mounting portions 452, 454 of the mirror unit 400 into the insert grooves 526, 528 of the mirror-unit receiver 408, from the insertion openings 530, 532. Subsequently, the worker, as illustrated in FIG. 16, inserts the mirror unit 400 into the mirror-unit receiver 408, until the leading end face of the mirror unit 400 is brought into abutment with the leading-end receiving section 520 of the mirror-unit receiver 408. In the abutment state, the mirror unit 400 is fixed in position.

More specifically, as illustrated in FIG. 21, as a result of the protrusion 550 being fitted into the recess 552, the mirror unit 400 is positioned with respect to the insertion direction. In addition, as a result of the first pressing member 540 depicted in FIG. 19 pressing the mirror unit 400 onto the groove bottom 544 of the insert groove 528, the mirror unit 400 is positioned with respect the width direction (the direction also referred to as a lateral direction, and indicated by "F1" in this Figure). Moreover, as a result of the third pressing members 560, 560 depicted in FIG. 19 pressing the mirror unit 400 upwardly (the direction also referred to as the thickness direction, and indicated by "F3" in this Figure), and pressing the upper face of the mirror unit 400 onto the groove walls 562, 564 of the insert grooves 526, 528, the mirror unit 400 is allowed to be positioned with respect to the thickness direction.

Upon completion of the positioning of the mirror unit 400 in the above manner, the plurality of power-supplied terminals 456–470 of the mirror unit 400 are brought into electrical contact with the plurality of power-supplying terminals P1–P8, respectively, and as a result, supply of electric power from the external power source not illustrated to the actuator 404 of the scanning mirror 402 is enabled.

As illustrated in FIG. 14, the scanning mirror 402 reflects the incident light N emerging from a light source not illustrated, and outputs the reflected light as the scanning light H. Once the actuator 404 actuates the scanning mirror 402 for its angular oscillation, using electric power supplied from the external power source, there is performed the deflection of the scanning light H by the scanning mirror 402, which is to say, a scan. Scanning the aforementioned screen with the scanning light H allows an image to be displayed on the screen.

Next, there will be described the procedure for a worker to conduct replacement of the optical scanning device 410, in a hypothetical case in which the mirror unit 400 is needed to be replaced due to damaged at its component, for example, the scanning mirror 402, the actuator 404, etc.

In this case, in the attached state illustrated in FIG. 16, the worker first attempts to pull out the mirror unit 400 from the mirror-unit receiver 408, by catching the mirror unit 400 at its catch 450. When a force exerted on the mirror unit 400 by the worker becomes large to some extent, the recess 552 illustrated in FIG. 21 elastically deforms in a direction away from the protrusion 550, and the recess 552 gets over the protrusion 550 and disengages from the protrusion 550. As a result, the mirror unit 400 is extracted from the mirror-unit receiver 408, whereby the mirror unit 400 is separated from the mirror-unit receiver 408.

Thereafter, the worker inserts a new mirror unit 400 into the mirror-unit receiver 408 to thereby assemble the mirror unit 400 and the mirror-unit receiver 408 with each other.

As is evident from the above explanation, in the optical scanning device 410 according to the present embodiment, the mirror unit 400 is configured to be attachable to and detachable from the mirror-unit receiver 408, and therefore, for example, where the scanning mirror 402 and the actuator 404 thereof are needed to be replaced due to damaged, only the mirror unit 400 can be replaced, without replacement of the mirror-unit receiver 408 having no need for replacement.

Incidentally, the optical scanning device 410, when used as, for example, a component of an image display apparatus, is essentially required, for properly displaying images, to hold the mirror unit 400 in a suitable installation position on its optical path. In addition, for example, replacement of the mirror unit 400 with a new mirror unit 400 may possibly cause the new mirror unit 400 to be installed in a position non-coincident with a regular position on its optical path. For these reasons, replacement of the mirror unit 400 would involve a need for realignment of the installation position of the new mirror unit 400.

In the present embodiment, however, when there is a need for replacement of the mirror unit 400, the mirror-unit receiver 408 is held fixed to the instant image display apparatus, without any changes in its installation position, and therefore, a mere inserting action of a new mirror unit 400 into that mirror-unit receiver 408 would assure that the new mirror unit 400 is installed in a regular position on its optical path.

The present embodiment, accordingly, would allow the alignment of the installation position of the mirror unit 400 resulting from its replacement, to be fully omitted, or, if not, would not require such alignment to be conducted as carefully as conventional techniques, whereby, at any rate, a worker's load would be eliminated.

Next, there will be described a fifth embodiment of the present invention.

Figure 23:
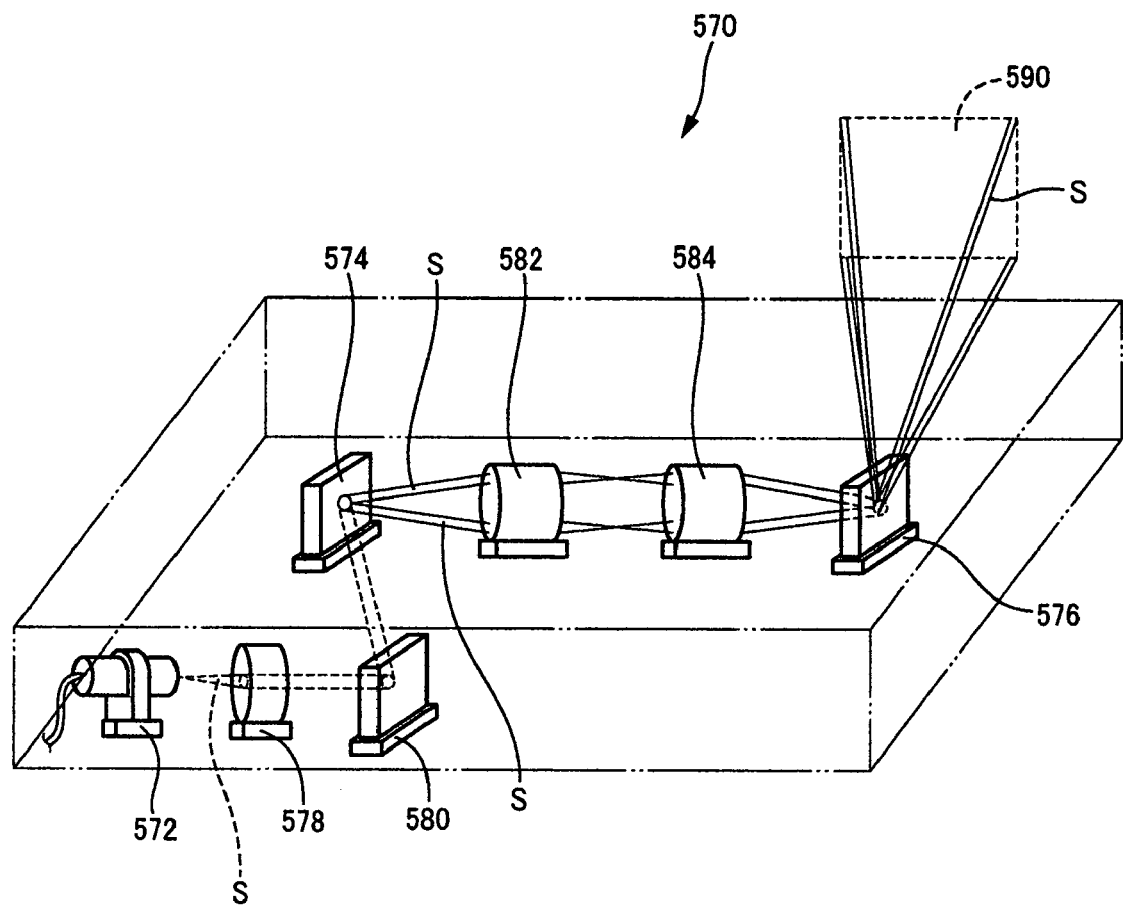
FIG. 23 is a perspective view illustrating the interior of an image display apparatus 570 according to a fifth embodiment of the present invention.

FIG. 23 illustrates in perspective view an image display apparatus 570 constructed according to the present embodiment, in which light is scanned using the optical scanning device 410 constructed according to the fourth embodiment. The image display apparatus 570 is constructed to include: a modulated-light emitter 572 for emitting modulated light S; a horizontal scanning subsystem (an example of a primary scanning device) 574 for scanning the emitted modulated light S horizontally; a vertical scanning subsystem (an example of a secondary scanning device) 576 for scanning the modulated light S vertically; a collimator lens 578; a reflective mirror 580; and relay optical systems 582, 584.

The horizontal and vertical scanning subsystems 574, 576 are configured using the optical scanning device 410 constructed according to the fourth embodiment. More specifically, in the horizontal scanning subsystem 574, the scanning mirror 402 of the optical scanning device 410 is angularly oscillated for horizontally scanning the modulated light S. In addition, in the vertical scanning subsystem 576, the scanning mirror 402 of the optical scanning device 410 is angularly oscillated for vertically scanning the modulated light S.

In the image display apparatus 570, the modulated-light emitter 572 modulates laser light in response to an external signal, to thereby emit the modulated light S. The modulated light S emitted from the modulated-light emitter 572, after being converged by the collimator lens 578, is reflected from the reflective mirror 580 into the horizontal scanning subsystem 574.

The modulated light S impinging on the horizontal scanning subsystem 574 undergoes a horizontal scan at the horizontal scanning subsystem 574, and then exits there. The modulated light S horizontally scanned at the horizontal scanning subsystem 574 enters the vertical scanning subsystem 576 via the relay optical systems 582, 584. The modulated light S impinging on the vertical scanning subsystem 576 undergoes a vertical scan at the vertical scanning subsystem 576, and then exits there. With the exiting modulated light S, the aforementioned screen 590 is scanned, to thereby display an image on the screen 590.

When the image display apparatus 570 according to the present embodiment is used, provided that the mirror-unit receiver 408 has been installed in a regular position on the optical path, mere attachment, needed for replacement of the mirror unit 400, of a new mirror unit 400 to the mirror-unit receiver 408 would automatically regulate the installation position of the new mirror unit 400 on the optical path.

It is added that the image display apparatus 570, although is of a projector type in which an image is projected onto the screen 590 spatially disposed, to thereby display the image on the screen 590, may be alternatively of a retinal scanning type in which the modulated light S is projected directly onto the retina of the viewer and is scanned on the retina, to thereby display an image on the retina. In this case, this image display apparatus 570 functions as a retinal scanning display device similarly with the first, second, and third embodiments.

It is further added that the image display apparatus 570 illustrated in FIG. 23, although employs the optical scanning device 410 according to the fourth embodiment for forming a visible image, may employ it for forming an invisible image, or for reading a visible image. An example of the image display apparatus 570 which uses the optical scanning device 410 for forming an invisible image is a laser printer using the optical scanning device 410 for forming an electrostatic latent image on a photosensitive material.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An optical scanner for scanning incident light two-dimensionally by oscillatory rotation of a reflective surface on which light is incident, the optical scanner comprising:

a first scanning device having a first mirror portion in which a first reflective surface is formed, the first scanning device scanning in a first direction, light which impinges obliquely on the first reflective surface, by oscillatory rotation of the first mirror portion about a first oscillation axis; and a second scanning device having a second mirror portion in which a second reflective surface is formed so as to be generally in parallel to the first reflective surface in a non-active state of the optical scanner, the second scanning device scanning in a second direction intersecting with respect to the first direction, the light exiting the first reflective surface and then entering obliquely the second reflective surface, by oscillatory rotation of the second mirror portion about a second oscillation axis intersecting with respect to the first oscillation axis, wherein the first oscillation axis is oriented substantially parallel to a direction in which the light enters the first reflective surface, when the optical scanner is viewed in a direction perpendicular to the first and second reflective surface, and wherein the second reflective surface has a dimension in a direction of the second oscillation axis, which is equal to or larger than a dimension expressed by $2 \cdot d \cdot \tan(\alpha/2)$, wherein:

$\alpha$ denotes an oscillation angle of the light scanned with the first reflective surface, and d denotes a distance by which centers of the first and second reflective surfaces are spaced apart from each other, when the optical scanner is viewed in a direction perpendicular to the first and second reflective surfaces.

2. The optical scanner according to claim 1, wherein the first scanning device further includes a first actuator for angularly oscillating the first mirror portion using a piezoelectric element, and wherein the second scanning device further includes a second actuator for angularly oscillating the second mirror portion using a piezoelectric element.

3. The optical scanner according to claim 1, wherein the light incident on the first reflective surface is parallel light.

4. The optical scanner according to claim 1, wherein the first scanning device scans the light at a frequency higher than that of the second scanning device.

5. The optical scanner according to claim 4, wherein the first scanning device performs a horizontal scan allowing the light to be scanned horizontally, and wherein the second scanning device performs a vertical scan allowing the light to be scanned in a direction intersecting with respect to a horizontal scan line.

6. The optical scanner according to claim 4, wherein the first and second scanning devices scan the light using respective resonance phenomena of the first and second mirror portions.

7. The optical scanner according to claim 4, wherein the first scanning device scans the light using a resonance phenomenon of the first mirror portion, while the second scanning device scans the light without using a resonance phenomenon of the second mirror portion.

8. The optical scanner according to claim 1, wherein the first and second reflective surfaces are disposed in series in a direction in which the light travels in the optical scanner, in the order set forth above, so as to be coplanar with each other, the optical scanner further comprising a third reflective surface reflecting light, once exiting the first reflective surface toward the second reflective surface.

9. The optical scanner according to claim 8, wherein the first and second mirror portions are formed in a same substrate.

10. The optical scanner according to claim 8, wherein the second mirror portion includes a portion overlapping the first scanning device when the optical scanner is viewed in a direction of the second oscillation axis.

11. The optical scanner according to claim 1, wherein the second scanning device further includes a stationary frame, and a connection connecting the second mirror portion with the stationary frame so as to allow the second mirror portion to angularly oscillate about the second oscillation axis, and wherein the second mirror portion includes a portion overlapping the connection when the optical scanner is viewed in a direction of the first oscillation axis.

12. An image forming apparatus for forming images by scanning a light beam, comprising:

a light source emitting the light beam; and an optical scanner two-dimensionally scanning the light beam once exiting the light source, to thereby form the images, wherein the optical scanner includes:

a first scanning device having a first mirror portion in which a first reflective surface is formed, the first scanning device scanning in a first direction, the light beam which impinges obliquely on the first reflective surface, by oscillatory rotation of the first mirror portion about a first oscillation axis; and a second scanning device having a second mirror portion in which a second reflective surface is formed so as to be generally in parallel to the first reflective surface in a non-active state of the optical scanner, the second scanning device scanning in a second direction intersecting with respect to the first direction, the light beam exiting the first reflective surface and then entering obliquely the second reflective surface, by oscillatory rotation of the second mirror portion about a second oscillation axis intersecting with respect to the first oscillation axis, wherein the first oscillation axis is oriented substantially parallel to a direction in which the light beam enters the first reflective surface, when the optical scanner is viewed in a direction perpendicular to the first and second reflective surfaces, wherein the light beam, once exiting the optical scanner, enters an image-formed plane in which the images are formed, without passing through any relay optical systems.

13. The image forming apparatus according to claim 12, being a retinal scanning type in which the light beam, once exiting the optical scanner, enters a retina of a viewer, to thereby directly project the images onto the retina.

14. An optical scanner for scanning incident light two-dimensionally by oscillatory rotation of a reflective surface on which light is incident, the optical scanner comprising:

a first scanning device having a first mirror portion in which a first reflective surface is formed, the first scanning device scanning in a first direction, light which impinges obliquely on the first reflective surface, by oscillatory rotation of the first mirror portion about a first oscillation axis;

a second scanning device having a second mirror portion in which a second reflective surface is formed so as to be generally in parallel to the first reflective surface in a non-active state of the optical scanner, the second scanning device scanning in a second direction intersecting with respect to the first direction, the light exiting the first reflective surface and then entering obliquely the second reflective surface, by oscillatory rotation of the second mirror portion about a second oscillation axis intersecting with respect to the first oscillation axis; and a common housing accommodating the first and second scanning devices, wherein the housing includes:

an entrance-side transmissive portion allowing light to enter the first reflective surface from an outside; and an exit-side transmissive portion allowing light to exit the second reflective surface toward the outside, wherein the first oscillation axis is oriented substantially parallel to a direction in which the light enters the first reflective surface, when the optical scanner is viewed in a direction perpendicular to the first and second reflective surfaces.

15. The optical scanner according to claim 14, wherein the entrance-side transmissive portion is smaller in size than the exit-side transmissive portion.

16. An optical scanner for scanning incident light two-dimensionally by oscillatory rotation of a reflective surface on which light is incident, the optical scanner comprising:

a first scanning device having a first mirror portion in which a first reflective surface is formed, the first scanning device scanning in a first direction, light which impinges obliquely on the first reflective surface, by oscillatory rotation of the first mirror portion about a first oscillation axis;

a second scanning device having a second mirror portion in which a second reflective surface is formed so as to be generally in parallel to the first reflective surface in a non-active state of the optical scanner, the second scanning device scanning in a second direction intersecting with respect to the first direction, the light exiting the first reflective surface and then entering obliquely the second reflective surface, by oscillatory rotation of the second mirror portion about a second oscillation axis intersecting with respect to the first oscillation axis; and a mirror support supporting the first and second mirror portions, wherein the mirror support includes a mounting portion at which the mirror support is to be detachably mounted on a receiver, wherein the first oscillation axis is oriented substantially parallel to a direction in which the light enters the first reflective surface, when the optical scanner is viewed in a direction perpendicular to the first and second reflective surfaces, wherein the first scanning device further includes a first actuator for angularly oscillating the first mirror portion using a piezoelectric element, wherein the second scanning device further includes a second actuator for angularly oscillating the second mirror portion using a piezoelectric element, wherein the optical scanner includes power terminals for supply of electric power to the first and second actuators, wherein the mirror support is inserted into the receiver for attachment thereto, and wherein the power terminals are disposed at a leading one of both ends of the mirror support spaced apart in a direction allowing the mirror support to be inserted into the receiver.

17. The optical scanner according to claim 16, further comprising a light-transmissive cover opposing the first and second mirror portions.

18. An optical scanner for scanning incident light two-dimensionally by oscillatory rotation of a reflective surface on which light is incident, the optical scanner comprising:

a first scanning device having a first mirror portion in which a first reflective surface is formed, the first scanning device scanning in a first direction, light which impinges obliquely on the first reflective surface, by oscillatory rotation of the first mirror portion about a first oscillation axis;

a second scanning device having a second mirror portion in which a second reflective surface is formed so as to be generally in parallel to the first reflective surface in a non-active state of the optical scanner, the second scanning device scanning in a second direction intersecting with respect to the first direction, the light exiting the first reflective surface and then entering obliquely the second reflective surface, by oscillatory rotation of the second mirror portion about a second oscillation axis intersecting with respect to the first oscillation axis;

a mirror support supporting the first and second mirror portions; and a receiver on which the mirror support is to be detachably mounted, wherein the first oscillation axis is oriented substantially parallel to a direction in which the light enters the first reflective surface, when the optical scanner is viewed in a direction perpendicular to the first and second reflective surfaces, wherein the receiver includes an insert groove allowing the mirror support to be inserted into the receiver, and wherein the mirror support is inserted into the insert groove for support by the receiver.

19. The optical scanner according to claim 18, wherein the first scanning device further includes a first actuator for angularly oscillating the first mirror portion using a piezoelectnc element, wherein the second scanning device further includes a second actuator for angularly oscillating the second mirror portion using a piezoelectric element, wherein the receiver includes first power terminals for supply of electric power to the first and second actuators, wherein the mirror support includes second power terminals for supply of electric power to the first and second actuators, and wherein the first and second power terminals are in electrical contact with each other with the mirror support being supported by the receiver.

20. The optical scanner according to claim 18, wherein the receiver is provided with the insert groove in the form of a pair of insert grooves which are engaged with a pair of lateral portions of the mirror support which are opposite to each other in a direction orthogonal to an insertion direction allowing the mirror support to be inserted into the receiver.

21. The optical scanner according to claim 18, wherein the receiver includes a positioner positioning the mirror support with the mirror support being supported by the receiver.

* * * * *